United States Patent [19]
Yamashita et al.

[11] Patent Number: 5,952,572
[45] Date of Patent: Sep. 14, 1999

[54] ANGULAR RATE SENSOR AND ACCELERATION SENSOR

[75] Inventors: Mitsuhiro Yamashita, Hirakata; Masayoshi Esashi, Sendai, both of Japan

[73] Assignee: Matsushita Electric Industrial Co., Ltd., Osaka, Japan

[21] Appl. No.: 08/784,405

[22] Filed: Jan. 17, 1997

[30] Foreign Application Priority Data

Jan. 19, 1996 [JP] Japan ................................ 8-007211

[51] Int. Cl.⁶ ....................................................... G01P 9/00
[52] U.S. Cl. .................... 73/504.04; 73/504.12; 73/514.29
[58] Field of Search ............................ 73/504.16, 504.12, 73/504.14, 504.02, 504.15, 514.32, 514.33, 514.34, 504.04, 514.29; 310/329, 321, 316, 332

[56] References Cited

U.S. PATENT DOCUMENTS

| 4,538,461 | 9/1985 | Juptner et al. . |
| 4,600,934 | 7/1986 | Aine et al. . |
| 4,706,046 | 11/1987 | Dieulesaint et al. . |
| 4,750,364 | 6/1988 | Kawamura et al. . |
| 4,891,255 | 1/1990 | Ciarlo . |
| 4,891,984 | 1/1990 | Fujii et al. . |
| 4,919,993 | 4/1990 | Woodruff ............................ 73/514.36 |
| 4,969,359 | 11/1990 | Mikkor . |

OTHER PUBLICATIONS

Satchell, D.W., et al. "A Thermally–Excited Silicon Accelerometer" May 3, 1989, *Sensors and Actuators*, vol. 17, Nr. 1/02, pp. 241–245 XP000118930.

*Primary Examiner*—Christine K. Oda
*Attorney, Agent, or Firm*—Smith, Gambrell & Russell, LLP; Beveridge, DeGrandi, Weilacher & Young Intellectual Property Group

[57] ABSTRACT

The sensor is a small-sized vibratory angular velocity sensor, and making use of anisotropic etching characteristics of single crystal silicon substrate, as shown in FIG. 1, four cantilever beams 103 of leading end load (masses 102) type are disposed in a cross form, and the center of gravity (coupling portion 104) thereof is supported by a bridge 105 to form a vibrator, which is excited by electrostatic force by utilizing electrodes 110, 115 formed above and below the end portion of the masses 102, and the angular rate is detected from the capacitance change.

6 Claims, 19 Drawing Sheets

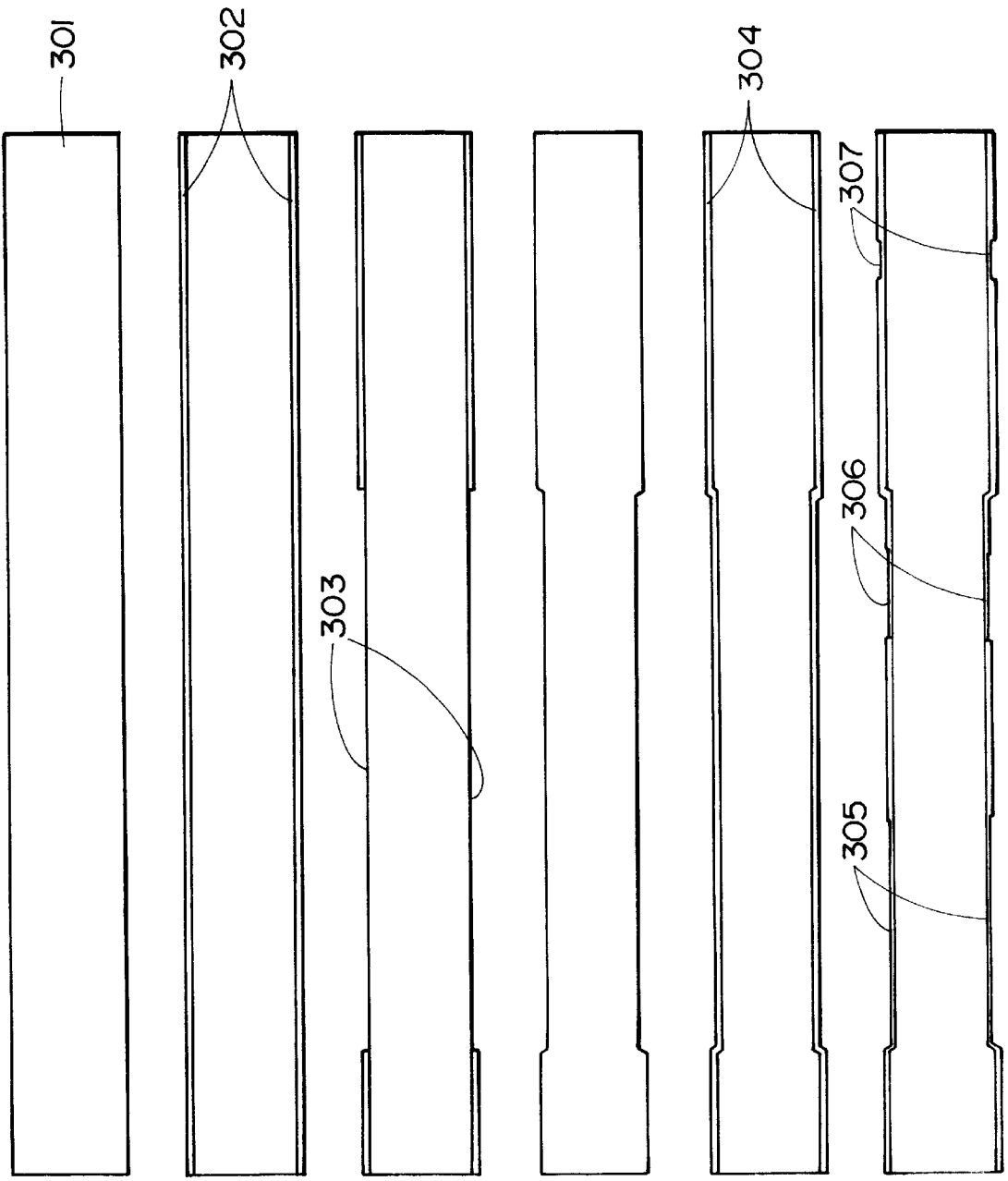

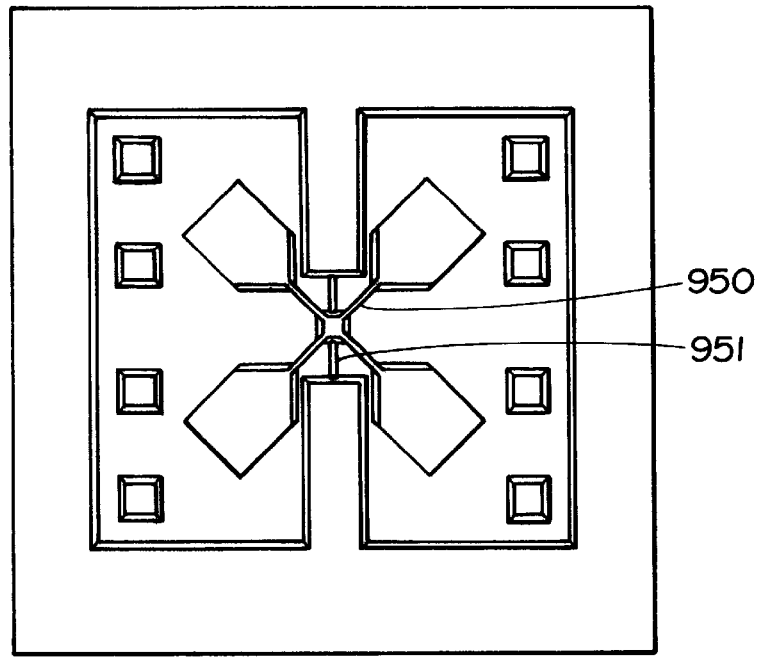
FIG. 9(a)
FIG. 9(b)
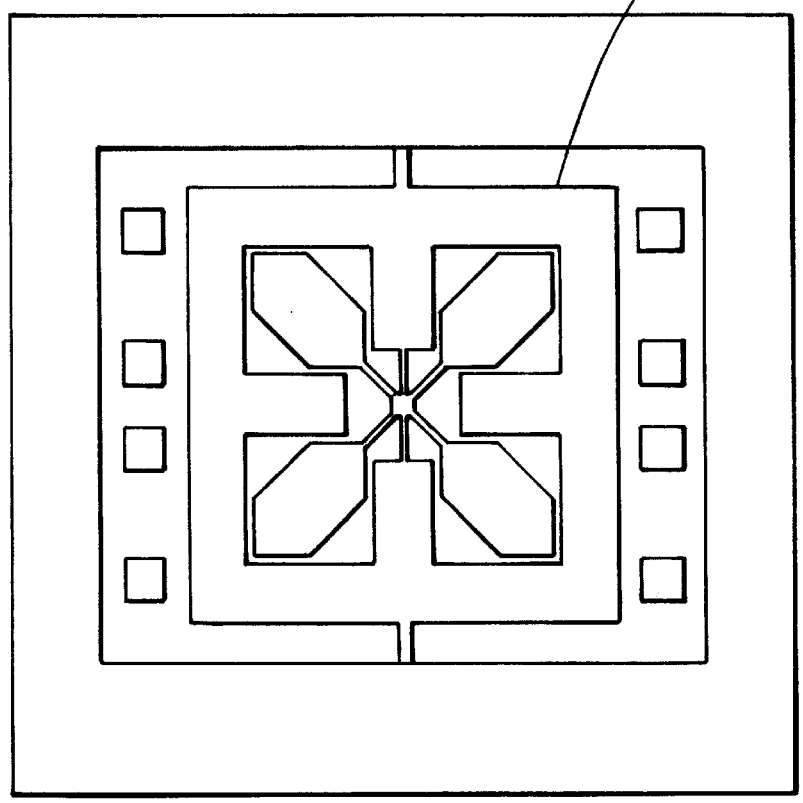

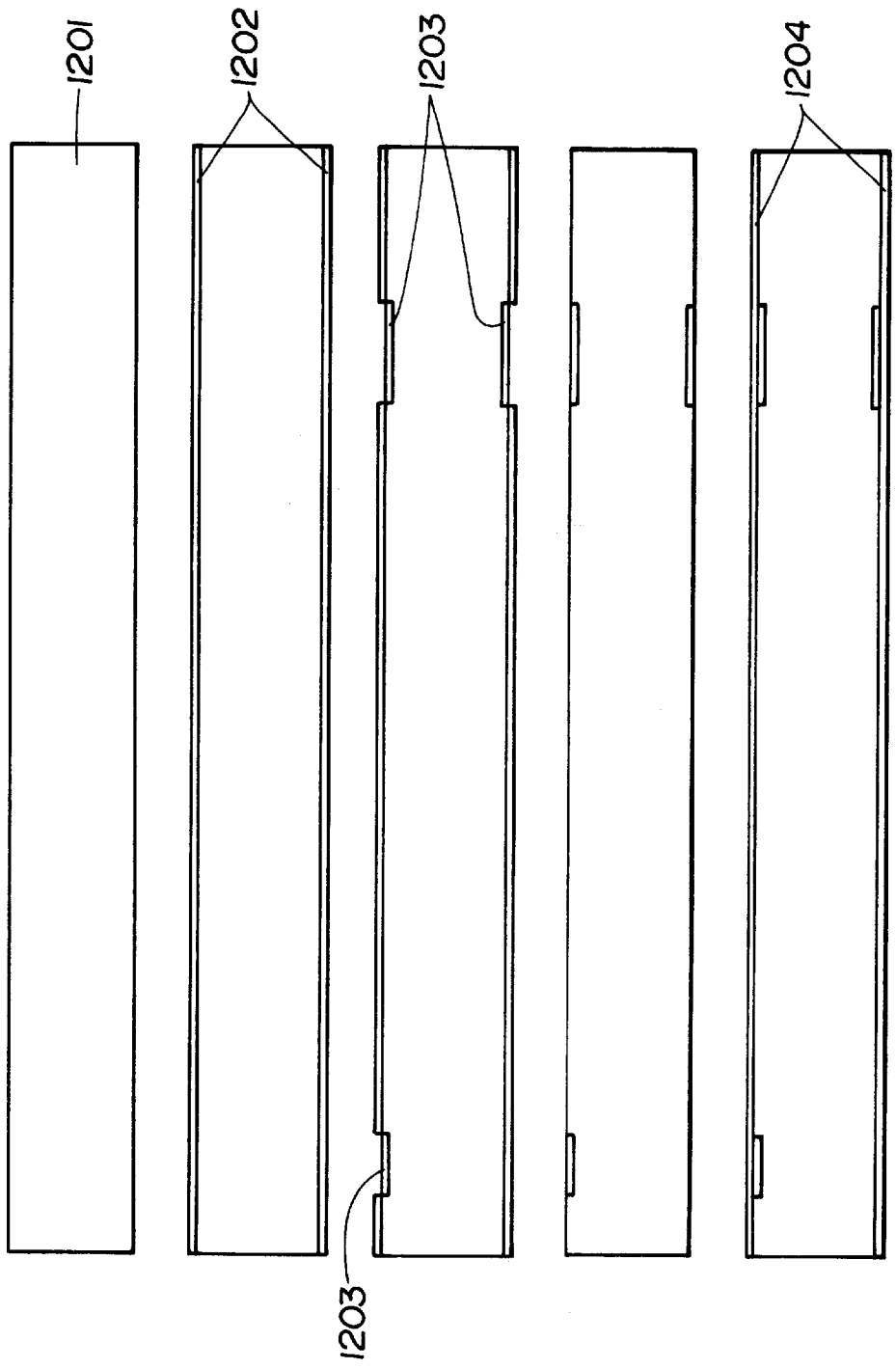

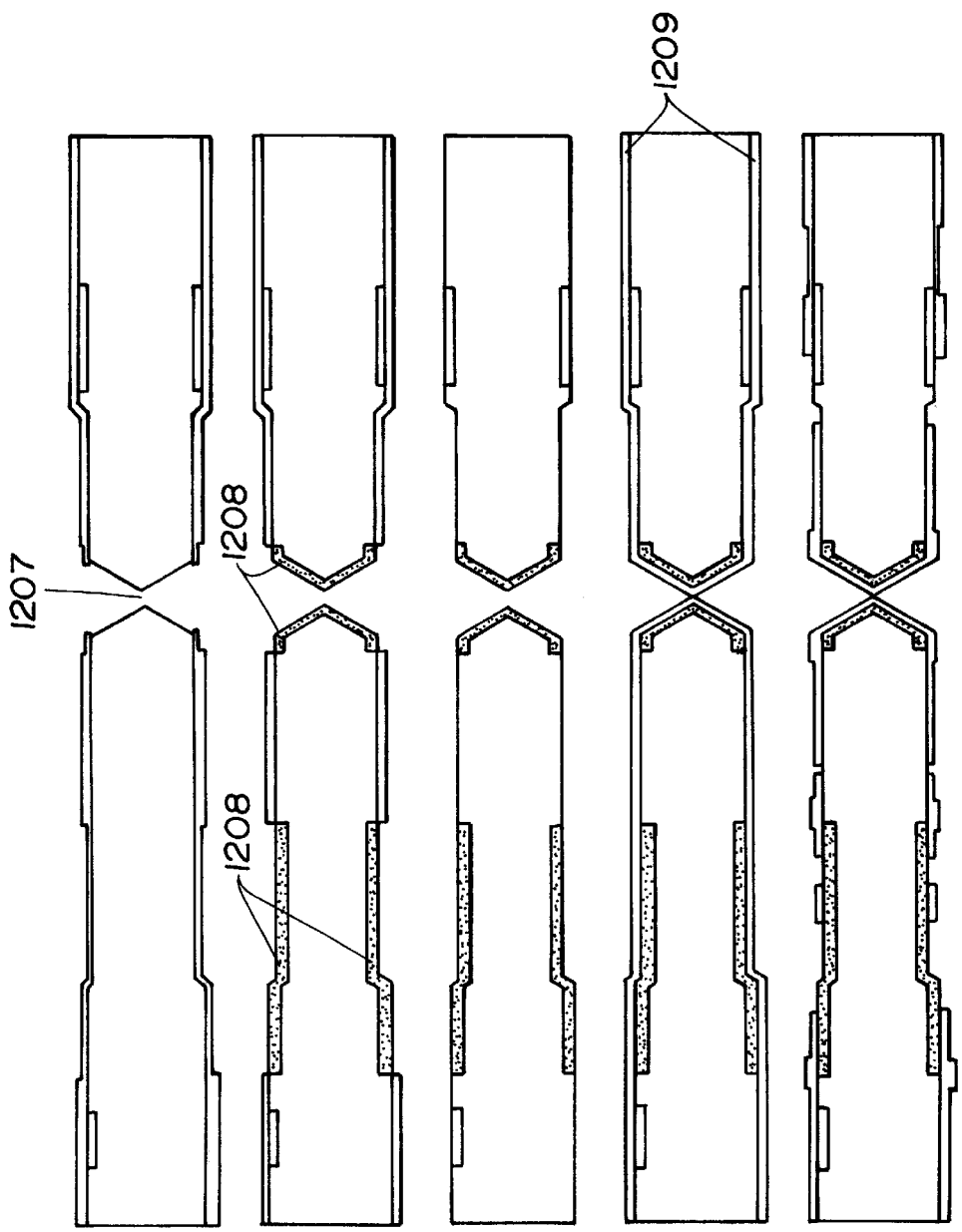

ANGULAR RATE SENSOR AND ACCELERATION SENSOR

BACKGROUND OF THE INVENTION

1. Field of the Invention

The present invention relates to an angular rate (an angular velocity) sensor and an acceleration sensor used, for example, in vehicle motion control, vehicle direction finding, etc.

2. Related Art of the Invention

Hitherto, various gyroscopes (hereinafter abbreviated as gyros) have been developed as sensors for detecting angular rate. They are roughly classified into the mechanical gimbaled spining wheel, fluid type gas rate gyroscope, vibratory gyroscope making use of vibration of tuning bar or tuning fork, fiber optic gyroscope, and ring laser gyro. The optical gyroscope detects the angular rate by making use of Sagnac effect, while others do by making use of Coriolis force which is an expression of angular momentum conservation law of a rotating body, and a proper sensor is selected depending on the purpose of use in consideration of precision, price, dimensions, etc.

A vibratory gyro type angular rate sensor is disclosed, for example, in Japanese Laid-open Patent No. 61-77712. FIG. 20 is an explanatory diagram of basic principle of this conventional vibratory angular rate sensor, in which 1401, 1402 are detecting elements, and 1403, 1404 are oscillating elements. Each element is composed of, for example, piezoelectric bimorph, and two sets of oscillating elements and detecting elements compose a tuning fork. The angular rate is detected by applying a alternating-current voltage to the oscillating element near the root of the tuning fork to vibrate the detecting element flexurally, and detecting the Coriolis force vertically applied to the surface of the detecting element by making use of the piezoelectric effect.

In the automotive application, it is often used in control of the chassis system, vehicle direction finding for navigation system. What is detected is, among three types of car body rotary motions of yaw, roll and pitch, often the angular rate in the yaw direction (rotation within a plane horizontal to the ground about the vertical line) (that is, yaw rate). The purpose of detection is, for example, in the case of chassis control of four-wheel steering (4WS) type, to improve the motion control performance by feeding back the yaw rate to the control system side as one of vehicle motion information, and in the case of navigation system, it is to calculate the turning angle of the vehicle by integrating the yaw rate by the time. The angular rate sensor for mobile use is generally the piezoelectric vibratory gyro and fiber optic gyro, and the optic gyro is already used for high precision application and the vibratory gyro, as inexpensive gyro, for mobile use.

As conventional examples of acceleration sensor, aside from the piezoelectric type reported, for example, by Asano et al. (Development of Acceleration Sensor and Acceleration Evaluation System for Super Low Range Frequency, SAE '91, pp. 37–49), the mechanical type and various types are being studied. As automotive applications, it is used in collision detection of air-bag and control of chassis system, and the magnitude of the acceleration to be detected is about ±50 G at maximum for air-bag and about ±2 G at maximum for chassis control. For mobile use, at the present, various techniques have been realized for both applications.

For mobile use or application in various devices, however, downsizing of electronic components is essential, and, for example, even the so-called small-sized piezoelectric vibratory gyro is not sufficiently small as compared with other electronic components, and further downsizing of angular rate sensor and acceleration sensor has been demanded.

SUMMARY OF THE INVENTION

In consideration of the above problems, it is an object of the invention to present a small-sized vibratory angular rate sensor and a small-sized acceleration sensor.

To solve the problems, the invention presents

The first invention is a sensor for detecting angular rate or acceleration comprises:

a vibrator including four masses having at least two parallel flat planes, first beams for supporting each mass at one end thereof, having principal planes formed vertically and linearly to the flat planes of said masses, a coupling portion for coupling all of said first beams, and second beams linked at specified fixed ends for supporting said first beams at said coupling portion, a first electrode group formed by making pairs above and below said masses parallel to flat planes of said masses and apart at a specified interval, and a second electrode group formed apart at a specified interval from flat planes of said masses, wherein said first beams are disposed substantially in an x-form about the coupling portion, with the center of gravity of all masses positioned at the coupling portion, and said masses are driven parallel to said first electrode group by electrostatic force between said masses and said first electrode group.

The second invention is a sensor for detecting angular rate or acceleration comprises:

a vibrator formed by using of single crystal silicon, including beams having a diffused resistor layer near a surface of said beams and masses supported by said beams, and heating means for generating Joule heat by injecting current into said resistor layer, wherein current is injected into the diffused resistor layer of said beams by said heating means, and said beams are deformed by thermal stress, thereby driving said masses.

The third invention is an acceleration sensor comprises:

a vibrator including four masses having at least two parallel flat planes, first beams for supporting each mass at one end thereof, having principal planes formed vertically and linearly to the flat planes of said masses, a coupling portion for coupling all of said first beams, and second beams linked at specified fixed ends for supporting said masses and said first beams at said coupling portion, and an electrode group formed apart at a specified interval from flat planes of said masses, wherein said first beams are disposed substantially in an x-form about the coupling portion, with the center of gravity of all masses positioned at the coupling portion, and the acceleration is detected by the capacitance change between said electrode group and masses.

According to the first invention, the vibrator is supported at one point by the coupling portion, and the coupling portion itself is supported from the fixed end, so that the vibrator of small energy loss is formed. According to the second means, the vibrator can be formed only by a single crystal material of small internal loss without adding sources of unwanted stress such as thin film to the surface. Accordingly, by either means, the Q value of the vibrator can be heightened and the detecting sensitivity of the angular rate can be enhanced relatively easily. Hence, a small-sized angular rate sensor can be composed.

According to the third invention, a beam having a section of a large aspect ratio can be formed, and a structure having a large flexibility in a plane parallel to the substrate can be formed, so that higher sensitivity is realized. Moreover, because of the structure of supporting each mass by the beams differing in the azimuth, the acceleration of two axes or more can be detected at least from the behavior of each mass. Hence, a small-sized acceleration sensor can be composed.

BRIEF DESCRIPTION OF THE DRAWINGS

FIG. 3(a) to (f) is part of process chart of silicon processing of the angular rate sensor in the first embodiment of the invention.

FIG. 9(a), (b) is a plan view of a silicon substrate showing other schematic constitution of the angular rate sensor in the first embodiment of the invention.

FIG. 15(a) to (e) is a part of process chart of silicon processing of the angular rate sensor in the second embodiment of the invention.

FIG. 17(k) to (o) is a different part of process chart of silicon processing of the angular rate sensor in the second embodiment of the invention.

Figure 1:
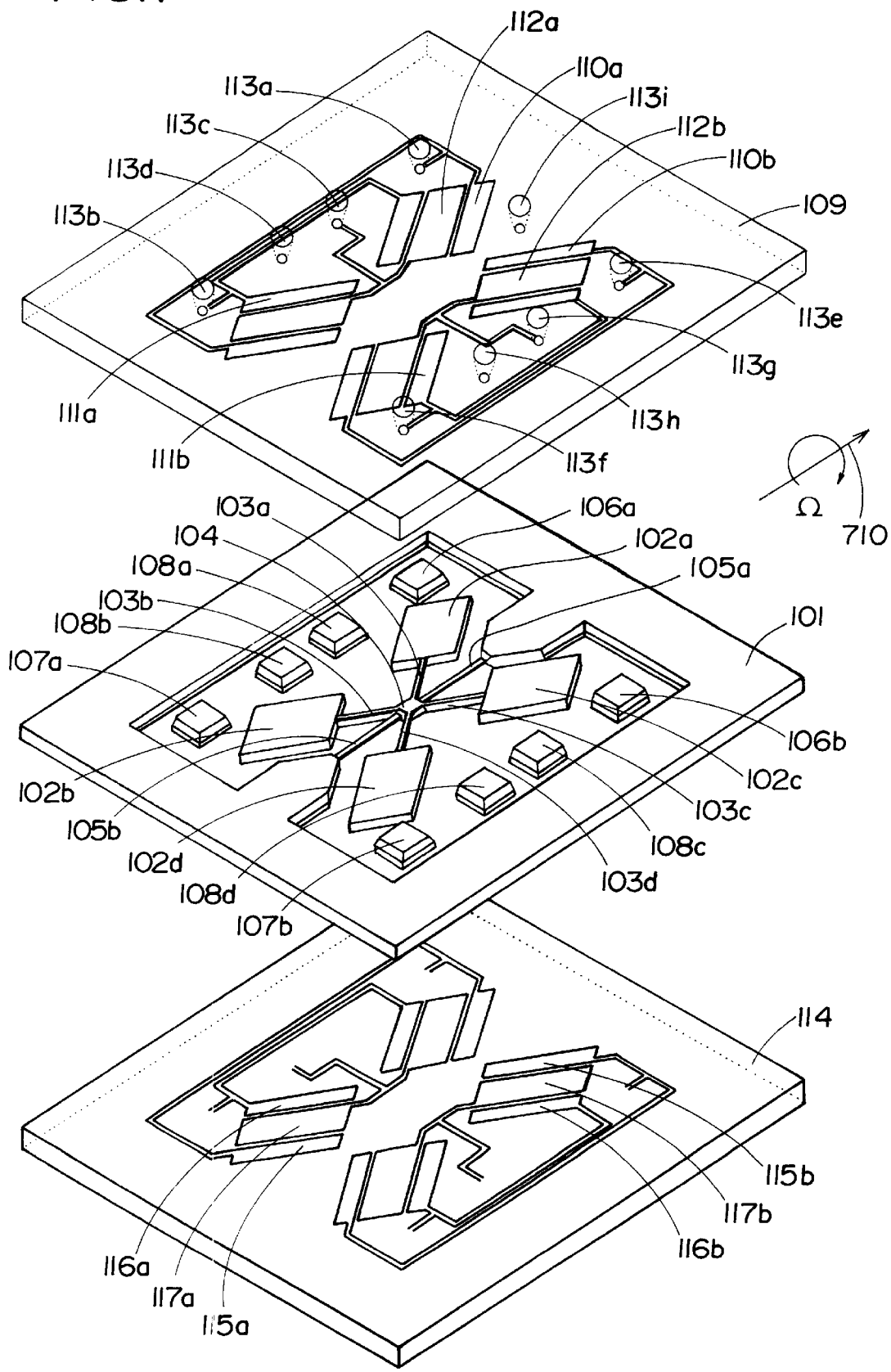
FIG. 1 is a perspective view showing a schematic constitution of an angular rate sensor in a first embodiment of the invention.

| Description of the Reference Numerals | |
|---|---|
| 101, 301, 602, 1101, 1201 | Silicon substrate |
| 109, 401, 601 | Upper glass |
| 114, 501, 604 | Lower glass |
| 102a, 102b, 102c, 102d, 316, 701, 901, 1001, 1004, 1213 | Mass |
| 702, 103a, 103b, 103c, 103d, 317, 902, 1005, 1212 | Cantilever beam |
| 104 | Coupling portion |
| 105a, 105b, 318b, 1002, 1211 | Bridge |
| 1104c, 106a, 106b, 107a, 107b, 108a, 108b, 108c, 108d, 1104a, 1104b, 1104d, 1104e, 1104f | Feedthrough island |
| 110a, 110b, 115a, 115b, 703, 903 | Driving electrode |
| 111a, 11b, 116a, 116b, 705, 905 | Monitoring electrode |
| 112a, 112b, 117a, 117b, 704, 904 | Detection/control electrode |
| 113f, 113a, 113b, 113c, 113d, 113e, 113g, 113h, 113i, 402 | Glass through hole |
| 1103d, 1007, 1103a, 1103b, 1103c, 1103e, 1103f | Silicon through hole |
| 1003, 1006, 1102a, 1102b, 1214 | diffused resistor layer |
| 607 | Wiring |
| 1401, 1402 | Detecting element |
| 1403, 1404 | Oscillating element |

DESCRIPTION OF THE PREFERRED EMBODIMENTS

Referring now to the drawings, preferred embodiments of the invention are described below.

A perspective view showing essential parts of a schematic constitution of an angular rate sensor in a first embodiment of the invention is given in FIG. 1. The first embodiment realizes a small-sized vibratory angular velocity sensor for driving and oscillating the vibrator by using an electrostatic force. That is, in FIG. 1, reference numeral 101 is a single crystal silicon substrate of (110) crystal plane, and in this example it is an $n^+$ substrate high in concentration of n-type impurity and low in resistivity. The vibrator, the principal part of the angular rate sensor is composed by disposing four cantilevers of leading end load type (the cantilevers including the cantilever beams 103a to d and masses 102a to d) in a cross form, and supporting the center of gravity thereof from two fixed ends by bridges (105a, b). This vibrator is formed. of silicon substrate 101 by crystallographic anisotropic etching in an etchant of KOH (potassium hydroxide), TMAH (tetramethyl ammonium hydroxide, $(CH_3)_4NOH$), etc. Herein, reference numerals 102a to d are masses, being composed of (110) crystal plane (flat plane) parallel to the substrate and side faces of (111) crystal plane vertical to the substrate. Reference numerals 103a to 3 are cantilever beams supporting the masses, and the side faces are (corresponding to the principal face of the first beam of the invention) are leaf springs composed of (111) crystal plane vertical to the substrate surface. Of the four cantilever beams 103*a* to *d*, subscripts a and d, b and c are identical in shape, and a and c, c and d are mirror symmetrical respectively. Reference numeral 104 is a coupling portion of the cantilever beams, and the center is located at the center of gravity of the entire masses. Incidentally, the above shape and relation are not specified as far as the shape of the cantilever beams and the relation of mirror symmetry are adjusted so that this center of gravity may not move during vibration. The masses supported by the four cantilever beams 103*a* to *d* are supported by bridges 105 extended from the silicon substrate 101 at the coupling portion 104. Herein, reference numeral 105 denotes both 105*a* and 105*b*. That is, in this specification, generally, reference numerals having subscripts may be expressed without subscripts to represent the entire pieces of the reference numerals with subscripts.

In this embodiment, the bridges 105 are leaf springs formed in the <100> direction of the (110) crystal plane parallel to the silicon substrate 101. Reference numerals 106 to 108 are feedthrough islands for taking out wiring from the electrodes, and 106 is used for driving, 107 for monitor, and 108 for detection/control. The feedthrough islands are etched in a state being supported by extra supporting beams from the silicon substrate 101, but since the extra supporting beams are finally cut off, they are not shown in the drawings for the sake of simplicity.

Reference numerals 109, 114 are made of glass of which coefficient of thermal expansion is very close to that of silicon (for example, borosilicate glass, Pyrex #7740, of. Corning), and each is anodically bonded with the silicon substrate 101 to compose an angular rate sensor. Reference numerals 110 to 112, 115 to 117 are electrodes made of Pt/Ti, etc., formed on the lower surface of the upper glass 109 or the upper surface of the lower glass 114 by a technique of PVD (physical vapor deposition) such as vacuum deposition or sputtering, which make pairs with the masses 102 of each silicon vibrator to form capacitors. In the embodiment, 110, 115 are electrodes for driving, 111, 116 for monitor, and 112, 117 for detection/control. The first electrode group of the invention nearly corresponds to the driving electrodes 110, 115, and the second electrode group of the invention (or merely the electrode group) nearly corresponds to the detecting/control electrodes 112, 117. Finally, reference numerals 113*a* to *i* are through holes of wiring formed in the upper glass 109, and are formed on the feedthrough islands 106 to 108 formed in each silicon substrate 101. Incidentally, the through hole 113*i* is formed on the substrate 101, not on the feedthrough island, and it is used for electrical grounding.

The fabrication process of the angular rate sensor of the embodiment thus constituted is described specifically below according to the flowchart, showing the shape of the section as seen along line A—A' in FIG. 2.

Figures 4A, 4B, 4C, 4D, 4E:
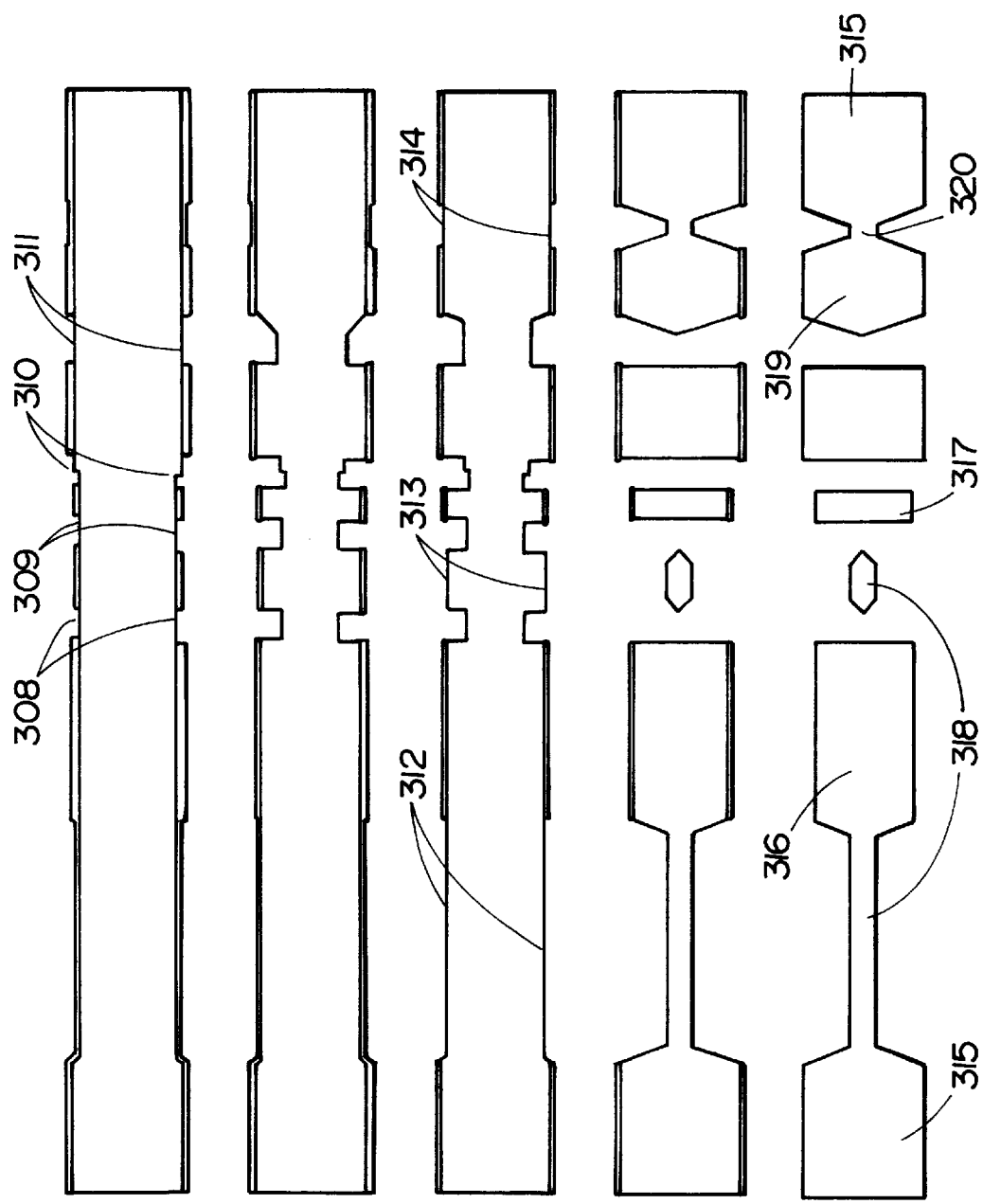
FIG. 4(g) to (k) is the remainder of process chart of silicon processing of the angular rate sensor in the first embodiment of the invention.

First, the silicon process is shown in FIG. 3 and FIG. 4. In the drawing showing each process, the left end corresponds to side A, and the right end in the drawing showing each process corresponds to side A' in FIG. 2. In FIG. 3 and FIG. 4, the process is executed sequentially from step (a) to step (k). The silicon substrate 301 shown at step (a) is a single crystal substrate of (110) crystal plane, $n^+$, and double-side polished type, and its thickness is, for example, 200 um. At step (b), after cleaning the substrate 301, a thermal oxide film 302 is formed by wet $O_2$ oxidation. At next step (c), by patterning by the photolithographic technique, the oxide film ($SiO_2$) is removed by etching only in the portion for finally forming the vibrator (303 in FIG. 3) by buffer hydrofluoric acid (BHF, 50% HF: 40% $NH_4F$= 9:100). The residual $SiO_2$ is a mask for etching Si. In this embodiment, wet etching is employed instead of dry etching for etching Si, and the etchant is potassium hydroxide (KOH) or tetramethyl ammonium hydroxide (TMAH). For forming the gap of the capacitor composed of the electrode on the glass and silicon vibrator, meanwhile, a method of etching the glass side may be considered, but in this embodiment the silicon substrate side is etched. The depth of etching is, for example, 5 um on both sides. After etching to the specified depth at step (c), the oxide film is once completely removed at step (d), and thermal oxidation is repeated at next step (e). For complete removal of oxide film, for example, a hydrofluoric acid solution (50% $HF:H_2O$=1:1) may be used. This oxide film 304 is a mask for wet etching of the silicon vibrator, and hence a thick oxide film is formed. In the embodiment, the oxide film is etched in two steps (f) and (g). At step (f), the Si substrate is formed thinly with a step, and the oxide film is partly etched only in the portion to be left over. In FIG. 3, reference numerals 305, 306 are bridges for supporting the vibrator, and 307 is a extra supporting beam for supporting the feedthrough island when etching Si.

Next step (*g*) is a step of completely removing the oxide film of the penetration etching portions (308 to 311) on the Si substrate. At step (h), only the Si penetration portion is etched to a specified depth. In the embodiment, the depth of etching at this step determines the thickness of the bridges and extra supporting beam. Incidentally, the thickness of the oxide film in the portions 305 to 307 etched at step (f) should be sufficient so as not to be removed completely by the Si etchant when etching Si at this step (h). At step (i), the Si substrate is formed thinly with a step, and the oxide film is completely removed only in the portion to be left over. That is, since a step is formed in the oxide film at step (f), it is enough by etching the oxide film uniformly until the oxide film is removed in the portions of 312 to 314. At next step (j), Si is etched until the bridges are formed into a specified thickness. Finally, at step (k), the oxide film is removed completely. At the end, reference numeral 315 corresponds to a peripheral frame, 316 to the coupling portion (104) of mass (102*b*) of vibrator and cantilever beam (103*b*), 317 to the cantilever beam (103*b*) for supporting the mass, 318 to the bridges (15*b*) for supporting the entire vibrator, 319 to the feedthrough island (107*a*) for wiring the electrode, and 320 to the extra supporting beam fur supporting the feedthrough island 319. In the explanation of step (k), the reference numerals in parentheses refer to the numerals used in FIG. 1 corresponding to each position.

In this stage, the feedthrough island 319 is linked with the frame 315 through the extra supporting beam 320. In the embodiment, the vibrator is composed by the step etching technique of silicon oxide film ($SiO_2$), but it is also possible to form a vibrator with a finer step by using both oxide film and nitride film ($Si_3N_4$) as the mask when etching Si. In this case, for etching the nitride film, phosphoric acid ($H_3PO_4$) may be used.

Figures 5A, 5B, 5C:
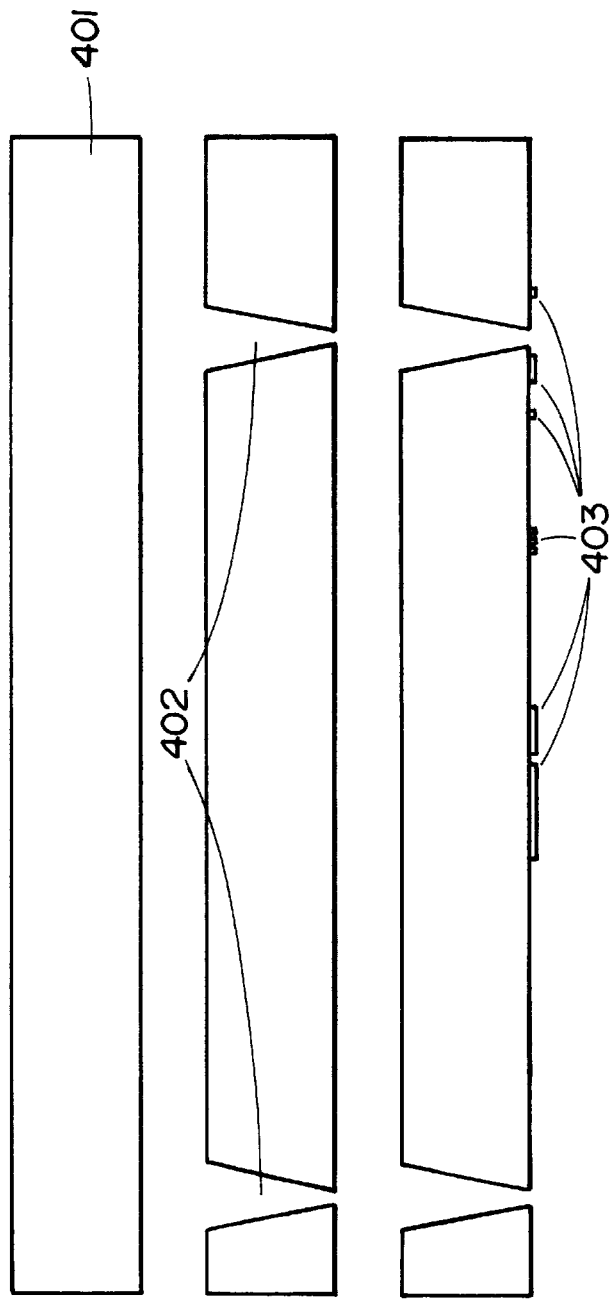
FIG. 5(a) to (c) is a process chart of upper glass processing of the angular rate sensor in the first embodiment of the invention.
Figures 6A, 6B:
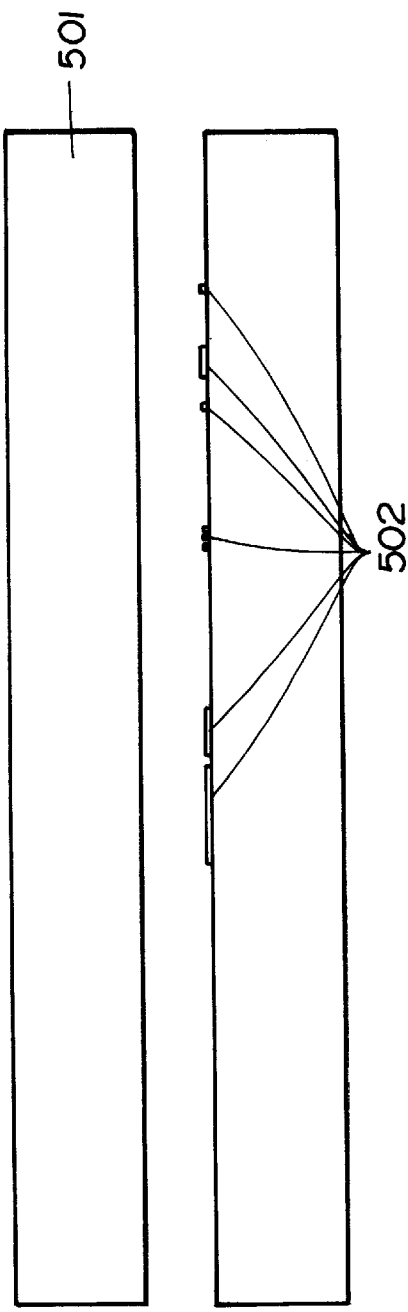
FIG. 6(a), (b) is a process chart of lower glass processing of the angular rate sensor in the first embodiment of the invention.
Figure 7A:
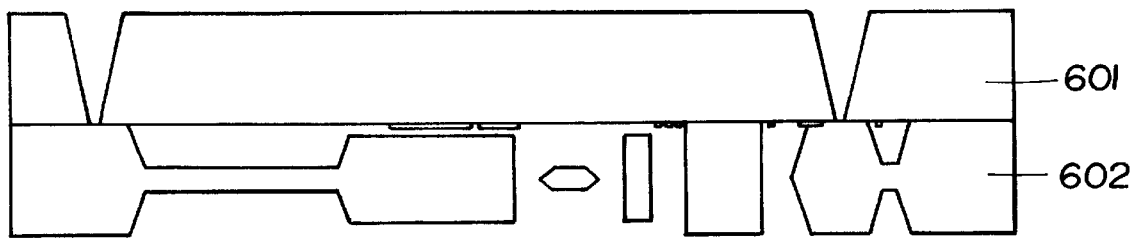
FIG. 7(a) to (d) is a process chart of assembly process of the angular rate sensor in the first embodiment of the invention.
Figure 7B:
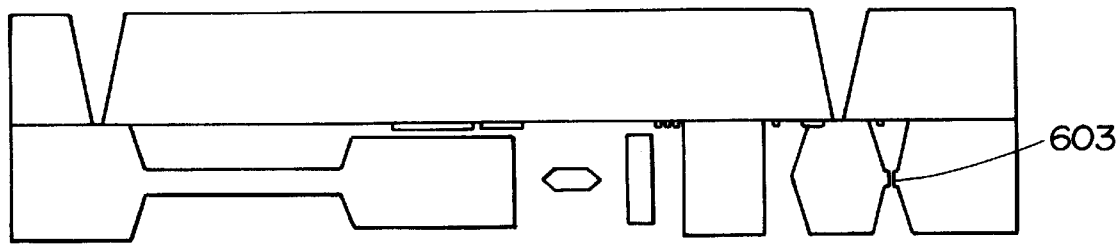
Figure 7C:
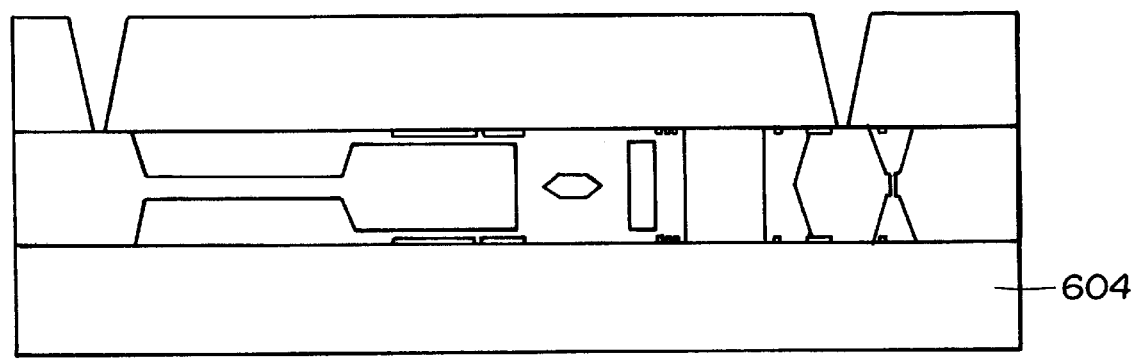
Figure 7D:
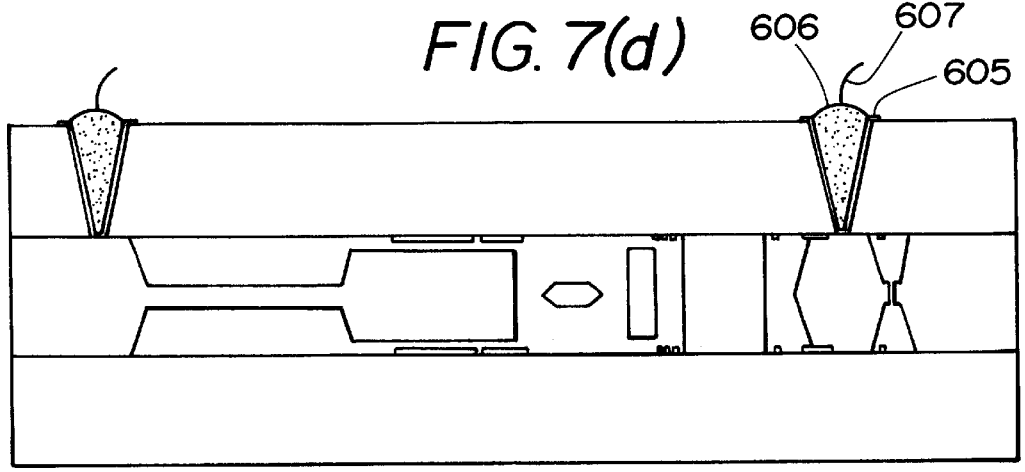

The glass process is shown in FIG. 5 and FIG. 6.

Figure 2:
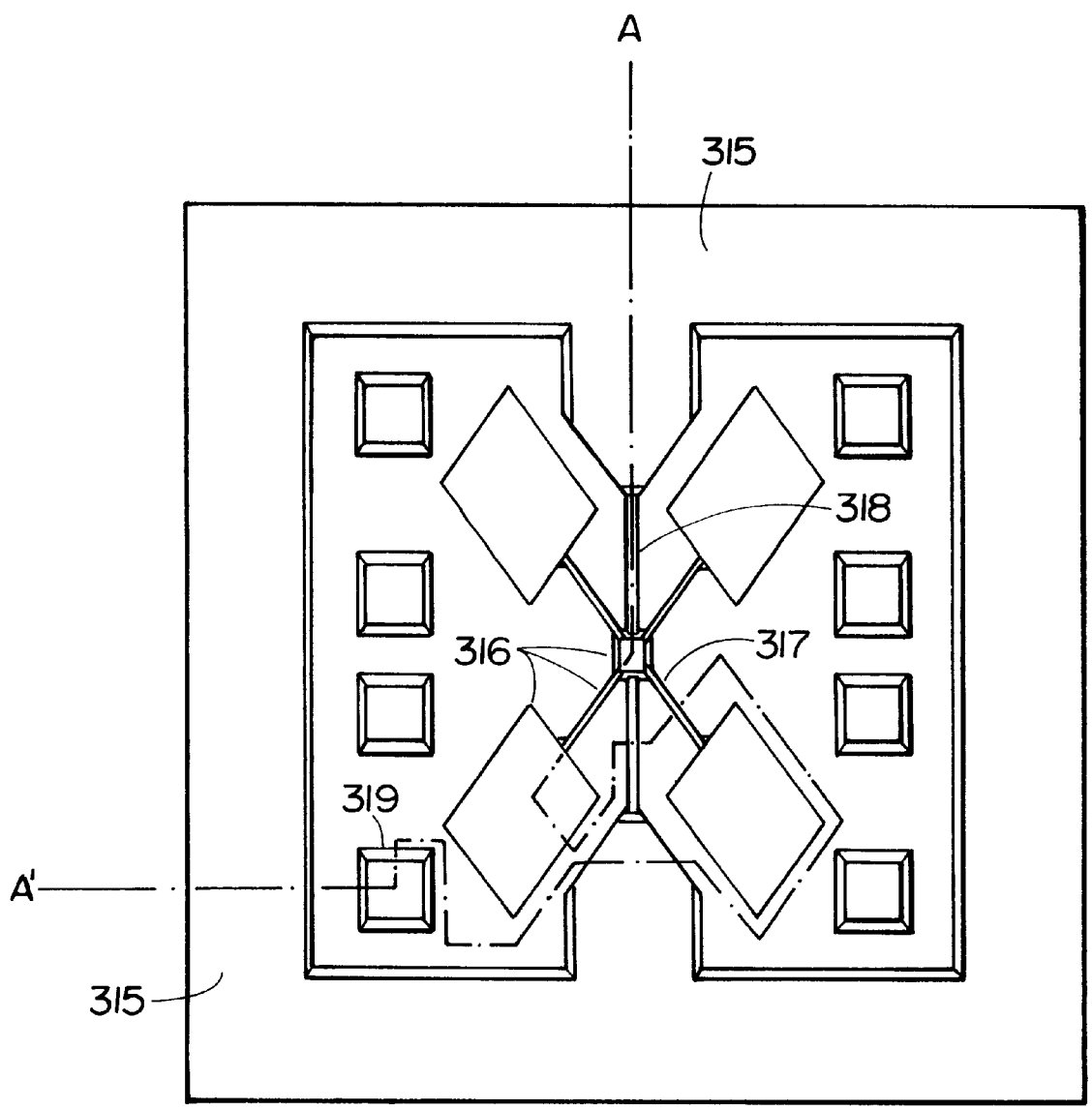
FIG. 2 is a plan view of a silicon substrate of the angular rate sensor in the first embodiment of the invention.

The sectional views used in explanation of glass process refer to the section by the line corresponding to line A—A' in FIG. 2. FIG. 5 shows the upper glass 401 and FIG. 6 shows the lower glass 501, and the upper glass 401 is different from the lower glass 501 in the constitution of forming a through hole for electrical wiring. At step (a) in FIG. 5, the upper glass 401 is a glass of which coefficient of thermal expansion is very close to that of silicon (for example, Pyrex #7740), and its thickness is 1.2 mm in this embodiment. At step (b), a through hole 402 is formed in the glass. It may be formed, for example, by electrolytic discharge cutting in aqueous solution of sodium hydroxide (35% NaOH), or by employing laser (for example, excimer laser of high output). Incidentally, the electrolytic discharge cutting is reported by Shoji et al. (Photoetching and electrochemical discharge drilling of Pyrex glass, Technical digest of 9th sensor symposium, 1990, pp. 27–30). After forming the through hole 402, at step (c), an electrode 403 is formed at the lower side. The electrode may be formed by evaporating Pt/Ti with electron beam, or a transparent electrode such as ITO may b formed by sputtering. Besides, metal materials of two or more kinds of composition may be used depending on the position. This ends the processing steps for the upper glass 401.

The lower glass 501 is made of same material as the upper glass 501, and processing is over when the upper electrode 502 is formed on the upper side at step (b) in FIG. 6, same as at step (c) in FIG. 5.

This ends processing of the silicon substrate 101 (301), upper glass 109 (401), and lower glass 114 (501). In the above explanation, numerals in parentheses are numerals used in the explanation of the silicon process and glass process in FIG. 3 to FIG. 6, corresponding to each position.

After the silicon process and glass process, finally by the assembling process shown in FIG. 7, the silicon substrate and glass are bonded anodically and the vibrator is completed. In the following description, two reference numerals are enclosed in parentheses. That is, the first numeral of the two in parentheses refers to the numeral used in FIG. 1 corresponding to each position, and the second numeral is the numeral used in the explanation of silicon process and glass process in FIG. 3 to FIG. 6. To wit, the two numerals in parentheses indicate the same position.

First, at step (a), the upper glass 601 (109, 401) and silicon substrate 602 (101, 301) are bonded anodically. For anodic bonding, both silicon and glass are heated in vacuum (for example, 300 to 400° C.), and a negative voltage of about 1,000 V in terms of reference potential of the silicon substrate is applied to the glass side.

At next step (b), the extra supporting beam is cut off. For example, YAG laser is focused in the extra supporting beam 603 (320) in $NF_3$ gas to heat locally, and silicon is dry etched by reaction with etching gas. This technique is generally called YAG laser assisted etching, and is. reported by Minami et al. (YAG laser assisted etching for releasing silicon micro structure, MEMS '93, pp. 53–58).

At step (c), the silicon substrate 602 bonded to the upper glass 601 and the lower glass 604 are bonded anodically in the same manner as in step 9a). In this process, anodic bonding can be performed at a specified degree of vacuum, and, for example, by bonding in an argon atmosphere at a desired pressure and sealing a non-volatile getter material such as Zr—V—Fe/Ti, the internal pressure may be equalized to the partial pressure of argon. This is reported by Itsumi et al. (Vacuum packaging for microsensors by glass silicon anodic bonding, Transducers '93, pp. 584–587). Finally, wiring is connected at step (d). After sputtering and sintering Al 605 from outside into the through hole in the upper glass 601, a lead wire 607 is connected by using conductive epoxy 606. This is the assembling process. Instead of Al, meanwhile, Cr-Au. may be evaporated.

Figure 8A:
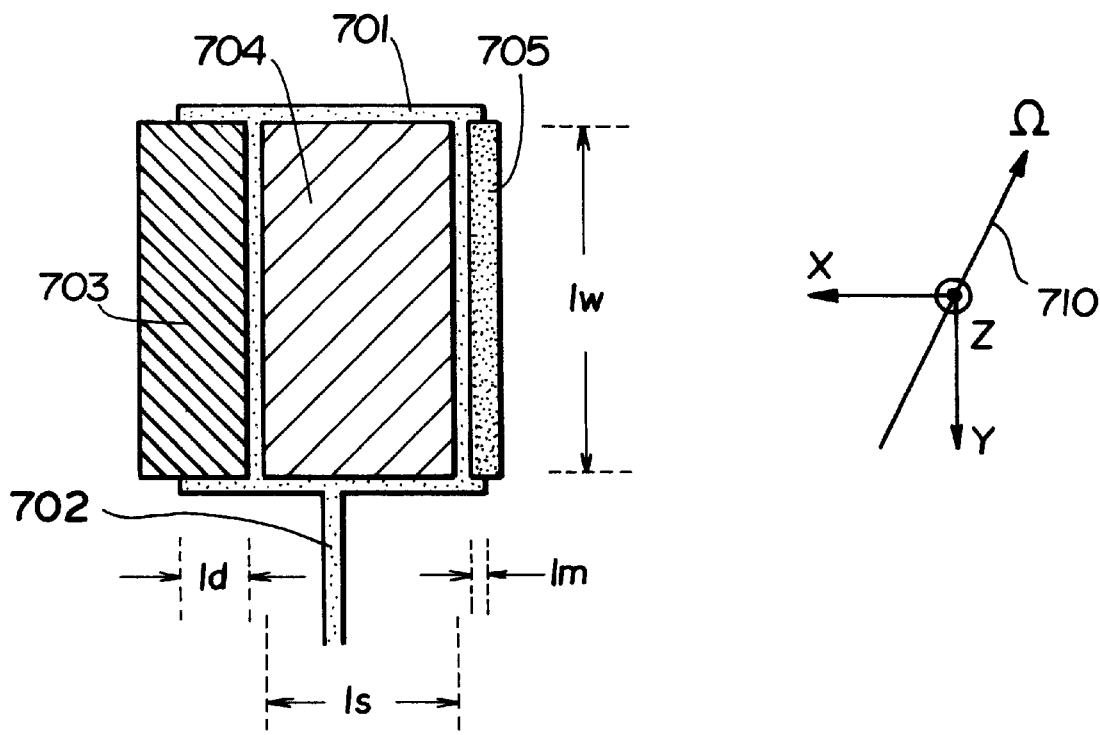
FIG. 8(a), (b) is an explanatory diagram showing the principle of operation of the angular rate sensor in the first embodiment of the invention.
Figure 8B:
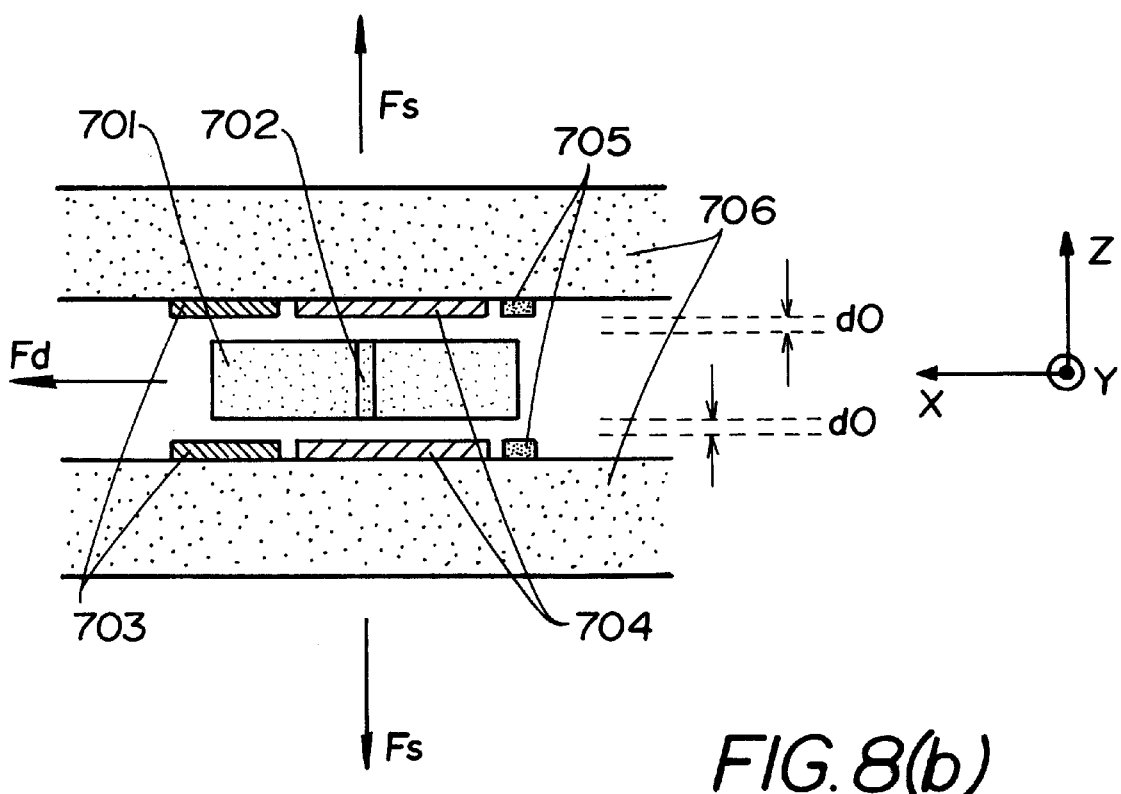

In the angular rate sensor of the embodiment thus constituted, the operating principle is described below. FIG. 8 is a conceptual diagram of driving and detection of the vibrator. Diagram (a) is a plan view of one mass for composing the vibrator, and (b) is a sectional view of its vicinity. In FIG. 8, reference numeral 701 is a mass of cantilever of leading end load type formed of silicon, and 702 is a cantilever beam for supporting the mass 701, which correspond to 102 and 103 in FIG. 1. Reference numeral 706 is a glass corresponding to 109, 114 in FIG. 1, and electrodes 703 to 705 are formed at the silicon side surface. In the embodiment, reference 703 is an electrode for driving, 705 for monitor, and 704 for detecting and control, individually corresponding to 110, 115, 111, 116, 112, 117 in FIG. 1, and a capacitor is formed by making a pair with the mass 701.

When voltages of equal absolute values are applied to two driving electrodes 703, the forces in the z-axis direction are canceled each other to be nil, but a force in the x-axis direction parallel to the electrode surface is generated (assuming, however, that the two electrodes are equal in area, and that the electrode interval of the capacitor, or the distance between the mass 701 and electrode 703 is equal). At this time, supposing the force generated in the x-axis direction parallel to the silicon and glass to be Fd, the energy of the capacitor formed by two electrodes 703 and mass 701 to be Ud, and the total capacitance to be Cd, Fd is expressed as $$F_d = -\frac{\partial U_d}{\partial x} = \frac{1}{2}\frac{Q_d^2}{C_d^2}\frac{\partial C_d}{\partial x} \approx \frac{\varepsilon l_w V_d^2}{d_0} \qquad \text{[Formula 1]}$$

(assuming, however, an approximation that the electrode interval $d_0$ of the capacitor is sufficiently smaller than the glass interval, that is, the interval of mutual electrodes formed on two pieces of glass). As known from formula 1, the magnitude of the electrostatic force Fd in the x-axis direction that can be generated by two driving electrodes 703 is proportionally to the electrode width vertical to the driving direction and inversely proportional to the electrode interval of the capacitor, and is proportion to the square of the applied voltage. For example, supposing the electrode interval do to be 5 $\mu$m, the electrode width to be 1w=2 mm, and the applied voltage to be Vd=10 V, the driving force is Fd=0.354 $\mu$N from numeral 1. Incidentally, if there is a certain fluctuation in the electrode area and electrode interval, the mass 701 is dislocated to the position of equilibrium of the restoring force determined by the spring constant in the z-axis direction and the electrostatic force generated by the both electrodes 703, and the position in the z-axis direction is determined, and the force in the z-axis direction becomes zero.

This Fd is used for driving in the x-axis direction of the mass 701. A static dislocation amount of the mass 701 is determined by Fd/kd according to Hooke's law once the spring constant kd in the x-axis direction of the beam 702 is determined. For example, supposing kd=100 N/m, the dislocation amount is Fd/kd=3.54×10$^{-3}$ $\mu$m. Thus, the static dislocation amount is a very small value, but by matching the vibration frequency in the x-axis direction with the resonance frequency of the vibrator, dynamically, a dislocation amount multiplied by Q factor is obtained. In particular, when the vibrator is formed of single crystal silicon as in the embodiment, since the internal loss is extremely small, a large factor exceeding, for example, 10,000 may be obtained, so that a large vibration amplitude (for example, about 10 $\mu$m) may be achieved.

To drive at a desired vibration frequency, an alternating-current voltage Vac and a direct current voltage Vdc at a desired resonance frequency $\omega$ may be superposed and applied, for example, to the electrode 703. In this case, from formula 1, the relation of Fd Vd² is established, but since $$V_d^2 = (V_{dc} + V_{ac}\cos\omega t)^2 = \qquad\text{[Formula 2]}$$

$$V_{dc}^2 + \frac{V_{ac}^2}{2} + 2V_{dc}V_{ac}\cos\omega t + \frac{V_{ac}^2}{2}\cos(2\omega t) \approx$$

$$V_{dc}^2 + 2V_{dc}V_{ac}\cos\omega t \quad (\text{where } V_{dc} \gg V_{ac})$$

by setting each value so as to establish the relation of Vdc>>Vac, a driving force at same frequency as applied voltage may be obtained. In this way, by superposing and applying the alternating-current voltage Vac and direct current voltage Vdc to the driving electrode 703, it is possible to induce vibration in the direction parallel to the electrode surface.

When using such vibrator in the angular rate sensor, it is necessary to keep constant the driving amplitude in order to set uniform the final angular rate detecting sensitivity. The electrode for monitor 705 is an electrode for detecting driving amplitude for this purpose. When a driving voltage is applied to the driving electrode 703 and the mass 701 is driven in the x-axis direction, the overlapping area of the driving electrode 703 and mass 701 (that is, the area of the capacitor for monitor) varies in synchronism with the vibration. Detecting the change of the capacitor capacitance synchronized with the driving vibration, a feedback is applied to the driving voltage so that the AC component of capacitance change may be constant, so that the driving amplitude may be maintained uniform.

This is a case of externally excited oscillation, and self-excited oscillation is also possible by forming a single loop instead of applying alternating-current voltage Vac. Generally, oscillation occurs when Barkhausen's oscillation condition is satisfied (loop gain is one, and phase change of one loop is an integer multiple of 360 degrees), and therefore by applying only a direct current voltage Vdc and adjusting the loop gain and phase change, resonance can be induced at a desired vibration mode. In this case, too, by realizing the function as nonlinear resistance by using a multiplier or the like, the driving amplitude can be kept constant.

Suppose the model of the mass 701 in FIG. 8 is vibrating at velocity v in the x-axis direction. When the mass 701 rotates an angular rate Ω about the axis 710 included in the xy plane, the following Coriolis force acts on the mass 701.
[Formula 3]

$$F_c = 2m \times v \times \Omega$$

The Coriolis force may be regarded as an expression of angular Momentum conservation law of a rotating body, and its magnitude is proportional to the exterior product of the motion velocity v and angular rate Ω of the mass as shown in formula 3.

That is, when the axis of rotation 710 is included in the xy plane, the Coriolis force Fc is generated in the z-axis direction. Hence, if the vibrating direction of the mass 701 and the axis of rotation 710 are not parallel to each other, the mass 701 is dislocated in the z-axis direction, and the capacitance of the capacitor formed of the mass 701 and electrode 704 varies. Basically, the value of angular rate is determined by the capacitance change of the capacitor due to dislocation of the mass in the z-axis direction at the time of input of angular rate.

Incidentally, in the embodiment shown in FIG. 1, the vibrator is composed of four cantilevers. The beam for supporting the mass 102 is formed of (111) crystal plane vertical to the silicon substrate 101, and therefore the beams 103a, 103d, and 103b, 103c are respectively on a same straight line, and the beam 103a (103b) and beam 103c (103d) are in the configuration of intersecting at an angle of 70.53 degrees determined by the crystal structure. The bilateral beams 104 for supporting the entire vibrator is positioned in the <100> direction in the middle between the beam 103a (103b) and beam 103c (103d).

On the other hand, the axis of rotation 710 of input angular rate in this sensor is set parallel (<100> direction) to the bridges 104, passing through the center of gravity of the vibrator as shown in FIG. 1, and finally the axis of rotation 710 and vibrating direction of the mass 102 are all formed at an angle of 54.74 degrees.

Since there are four cantilever beams 103, four kinds of flexural linear vibration modes may be considered, but actually owing to the configuration of the driving electrodes, only the vibration mode driven in the direction of bridges 105 (inside) is excited simultaneously in each mass 102. Therefore, the Coriolis force is generated in the direction of upper glass 109 in the case of masses 102a, 102b, in the direction of lower glass 114 in the case of masses 102c, 102d, and in the entire vibrator the Coriolis force acts in the direction of torsional vibration about the bridges 105. Finally, by detecting the capacitance change by Coriolis force of the capacitor composed of silicon vibrator and electrode for detection and control, the input angular rate W is determined.

Meanwhile, since the effective mass m of the vibrator is relatively small, the Coriolis force expressed in formula 3 is a small value statically, but by matching the resonance frequency of the drive vibration and detection vibration (torsional vibration) about the bridges) and using at this frequency, dynamically, the detection amplitude multiplied by Q factor can be obtained, so that a sufficient sensitivity may be maintained. To match the resonance frequency, each dimension may be adjusted by computer simulation (modal analysis) of resonance frequency of the vibrator by using the finite element method.

The capacitance change is detected by converting into a voltage change (alternating-current voltage) by a C-V transducer. As the C-V transducer, as reported by Maenaka et al. (Silicon rate sensor using anisotropic etching technology, Transducers '93, pp. 642–645), the self-bias system may be employed by using J-FET of high input impedance as source follower. The capacitance changes of the capacitor formed of the electrodes 112a, 117b and of the capacitor formed of the electrodes 112b, 117a in FIG. 1 are inverted in phase. Therefore, by amplifying differentially after C-V conversion, capacitance changes of all capacitors can be detected as voltage changes. Moreover, to pick up only the angular rate information by removing effects of acceleration, synchronism may be detected by using driving signal. Anyway, by employing these techniques, the angular velocity can be detected from the dislocation of the masses generated by the Coriolis force acting on the vibrator.

In the above explanation, the angular rate is calculated from the dynamic dislocation amount of masses, but by employing the servo technology, the angular rate can be detected at higher sensitivity. When employing the servo, force Fs may be applied by using part of detecting and controlling electrodes in a direction of canceling the Coriolis force acting on the mass. On the basis of the potential of the mass 701, the electrostatic force Fs that can be generated-by applying a voltage to one detecting and controlling electrode 704 is expressed in formula 4 by the same concept as in formula 1, supposing the energy of the capacitor formed by the detecting and controlling electrode 704 and mass 701 to be Us and the capacitance to be Cs:

$$F_s = -\frac{\partial U_s}{\partial z} = \frac{1}{2}\frac{Q_s^2}{C_s^2}\frac{\partial C_s}{\partial z} = \frac{\varepsilon S_s V_s^2}{2d_0^2} = \frac{\varepsilon l_s l_w V_s^2}{2d_0^2} \quad \text{[Formula 4]}$$

where Ss is the area of detecting and controlling electrode. As known from formula 4, the magnitude of electrostatic force that can be generated by one electrode is proportional to the area of the electrode, inversely proportional to the square of the electrode interval of the capacitor, and proportional to the square of the applied voltage. Ultimately, it is enough to apply a force in a direction of canceling the Coriolis force according to formula 4. As the method of control, for example, the PWM method may be employed, or other method may be used.

In this way, in the first embodiment, by anisotropic etching of single crystal silicon substrate of (110) crystal plane, the mass mainly composed of the (111) crystal plane vertical to the substrate surface and supported by the cantilever beam in the <112> direction is formed, and at the coupling portion having the vibrator composed of four masses positioned at the center of gravity, by supporting with bridges in the <100> direction mainly composed of (110) crystal plane, the vibrator extremely excellent in symmetricity to the axis of rotation is formed. Accordingly, the center of gravity is not changed in either vibration mode of driving or detection, and energy loss may be small. Moreover, for detection of driving and angular rate of the vibrator, only the capacitors (electrostatic force) are used without using piezoelectric elements and the like, and therefore it is not necessary to form a thin film on the vibrator or adhere a thin plate, and unwanted stress is not generated in the vibrator. Hence, also because the vibrator is made of single crystal material which is small in internal loss, a high Q value can be obtained. Still more, since the beam is formed of leaf spring and its side surface is matched with the crystal surface of the single crystal silicon, the vibrator can be formed easily at excellent symmetricity and reproducibility, and hence the ease of fabrication and high Q value (that is, high sensitivity) are realized at the same time. Besides, as compared with the case of forming the vibrator with a thin film such as polysilicon, the vibrator of a lager mass can be formed in the same area, and the Coriolis force acting on the vibrator may be relatively large, so that the angular rate detection sensitivity can be enhanced in a small-sized sensor.

In the first embodiment, meanwhile, the vibrator is composed of four masses (and beams), but it may be composed of two pieces as far as the symmetricity is maintained. In such a case, in FIG. 1, the vibrator is composed of a combination of masses of 102b, 102d, or 102a, 102c. Likewise, instead of two bridges, one may be used, and the vibrator coupling portion may be supported from one side only, and as for cantilever beams, plural parallel beams may be formed as a set for one mass, and each mass may be supported individually.

Further, in the first embodiment, the single crystal silicon substrate of (110) crystal plane is used, but a single-crystal silicon substrate of (100) crystal plane may be also used. In this case, the vibrator is composed as shown in FIG. 9(*a*), and the cantilever beam 950 is disposed in <100> direction on (100) crystal plane vertical to the substrate surface, and the bridge 951, in <110> direction mainly on (100) crystal plane parallel to the substrate surface. That is, the cantilever beams intersect at 90 degrees each, and the intersection angle of the bridge and cantilever beam is 45 degrees. As the etchant, KOH, TMAH and others mentioned in the embodiment may be used. The bridge may be formed of a leaf spring vertical to the substrate plane, and in the case of (100) crystal plane substrate, it is intended to make use of the over-etching characteristic advancing from the peak of two (111) crystal plane planes appearing at an angle of 54.74 degrees to the substrate surface along the <110> direction when etched from both sides. In the case of (110) crystal plane substrate, it is intended to make use of the over-etching characteristic advancing from the peak of two (100) crystal planes appearing at an angle of 45 degrees to the substrate surface along the <100> direction.

In the embodiment, four cantilever beams are disposed in a cross form to form the vibrator, and its center of gravity is supported by bridges, but in a double structure by forming another vibrator 970 at the outside of the vibrator as shown in FIG. 9(*b*), the vibration mode may be set so that force may not be applied to the frame by finally passing the beam by inducing torsional vibration) in the opposite direction by the outside vibrator in the case of torsional vibration used as the vibration mode for detection. As a result, the energy loss of the vibrator can be further reduced, and the Q value in the detection mode can be further increased, and the detection sensitivity may be enhanced.

Figure 10:
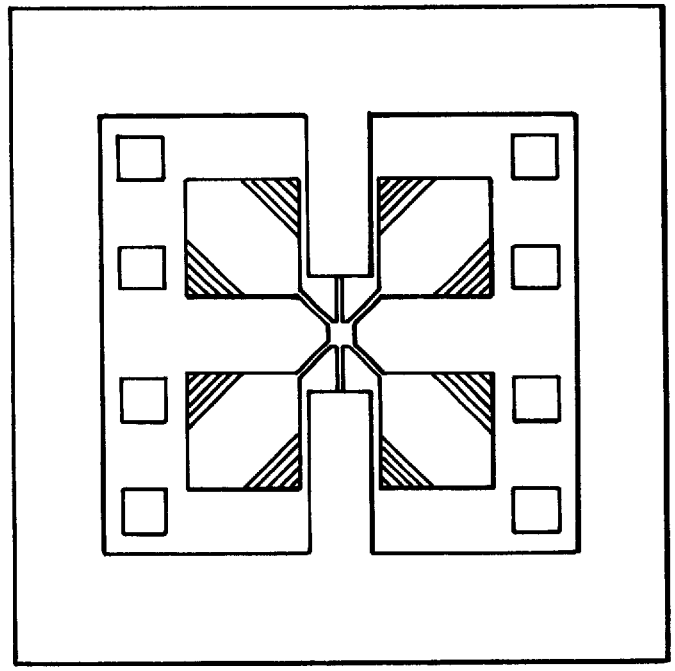
FIG. 10 is a part of a plan view of a silicon substrate showing another schematic constitution and an explanatory diagram of operating principle of the angular velocity sensor in the first embodiment of the invention.
Figure 11:
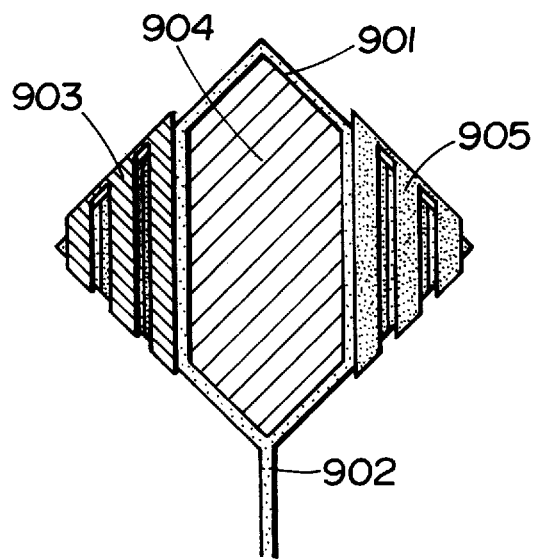
FIG. 11 is other part of a plan view of a silicon substrate showing another schematic constitution and an explanatory diagram of operating principle of the angular velocity sensor in the first embodiment of the invention.
Figure 12:
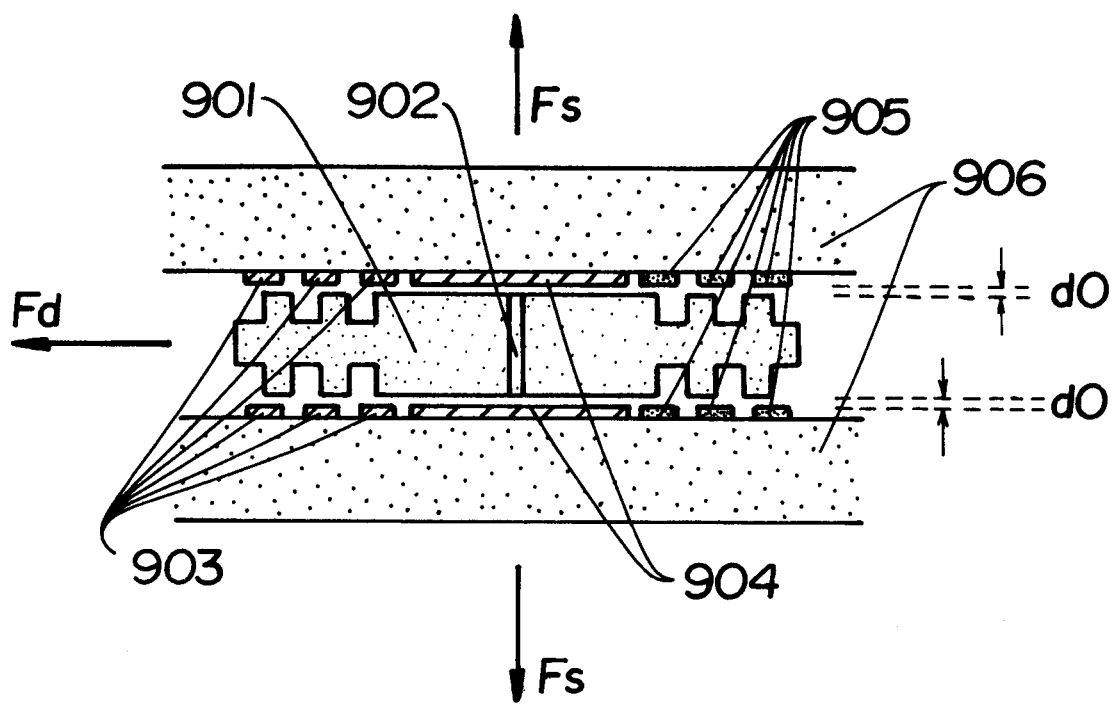
FIG. 12 is the remainder of a plan view of a silicon substrate showing another schematic constitution and an explanatory diagram of operating principle of the angular velocity sensor in the first embodiment of the invention.

In addition, in the embodiment, electrodes are disposed above and below the end portion of the mass vertical to the driving direction, and a voltage is applied to the electrodes to obtain a driving force in a direction parallel to the substrate surface, and for doing it more efficiently, as shown in FIG. 10, FIG. 11, and FIG. 12, a groove vertical to the driving direction may be formed on the mass, and the driving force may be obtained by making use of its groove end portion. FIG. 10 shows a schematic structure of the vibrator. In the embodiment, a single crystal silicon substrate of (100) crystal plane is used, and the cantilever beam 902 is formed in <100> direction on the (100) crystal plane vertical to the substrate surface, and the bridge is formed in <110> direction vertical to the substrate surface. Hence, the cantilever beams 902 intersect at 90 degrees, and the bridge and cantilever beam at 45 degrees, respectively. The mass 901 is formed nearly in a form of rectangular parallelepiped as shown in the drawing, but different from FIG. 9, the groove in the direction parallel to the cantilever beam for supporting each mass 901 is formed on both sides of the mass. The groove is formed as (100) crystal plane vertical to the substrate at the side and (100) crystal plane parallel to the substrate at the bottom, by making use of the characteristic of the etchant of KOH or TMAH, that is, the etching speed of the (110) crystal plane is faster than the etching speed of the (100) crystal plane. The configuration of the masses 901 and electrodes 903, 904, 905 is shown in FIG. 11 and FIG. 12. In FIG. 10, FIG. 11, and FIG. 12, reference numeral 901 denotes, as mentioned above, the mass of the cantilever of leading end load type formed of silicon, and 902 is the cantilever beam for supporting the mass 901 as mentioned above, respectively corresponding to 701 and 702 in FIG. 8. Reference numeral 906 is a glass corresponding to 706 in FIG. 8, and electrodes 903 to 905 are formed at the silicon side surface. In the embodiment, 903 is the electrode for driving, 902 for monitor, and 904 is for detection and control, and a capacitor is formed by making a pair with each mass 901. As known from formula 1, when driving the silicon vibrator parallel to the substrate by two parallel flat electrodes, the driving force is proportional to the electrode width vertical to the driving direction, but is irrelevant to the electrode area. Hence, when the driving electrode 903 is disposed as shown in FIG. 11 and FIG. 12, the driving force for the portion of the length of the groove sufficiently longer than one side of the mass 901 can be effectively obtained. Accordingly, the driving force is sufficiently larger than the case of driving at the end portion of the mass as shown in FIG. 9, and a large driving amplitude can be obtained by a small input voltage. Further, since the restriction about the outside design of the mass is decreased, the mass of the mass may be relatively large, which contributes to enhancement of sensitivity. When using the (110) crystal plane substrate, the groove may be formed in <112> direction, having the side surface formed of (110) crystal plane vertical to the substrate.

It is also possible to increase the driving force by setting the gap interval of the driving electrode and mass wider than the gap interval of other electrode and mass, so that a relatively large voltage may be applied to the driving electrode.

In the embodiment, the vibrator of the angular velocity sensor is composed by making use of anisotropic etching characteristic of silicon, but it may be also formed by reactive ion etching (RIE) in $SF_6$ gas, for example, using a plated Ni film as mask. The RIE of bulk silicon is described in the paper disclosed by Esashi et al. (High-rate directional deep dry etching for bulk silicon micromachining, J. Micromech. Microeng. 5 (1995), pp. 5–10).

Incidentally, when the resonance frequency of the vibrator is matched in driving and detection mode and the vibrator is driven at this frequency, a maximum sensitivity can be obtained, but it is more difficult to match the two completely as the Q value becomes higher. But, by applying a direct current voltage to the electrode (for example, part of detecting and controlling electrodes) to lower the spring constant of the bridge apparently, the resonance frequency of the torsional vibration mode used in detection can be lowered. This is because, according to Hooke's law, the apparent spring constant is expressed by a proportional constant to the primary term of dislocation in the z-direction of the mass, while application of electrostatic force causes to add a term influenced by the electrostatic force to the primary term of dislocation. Since the electrostatic force and the restoring force by spring are opposite in direction, when a voltage is applied, the resonance frequency changes in a lowering direction. Hence, by setting the resonance frequency of detection mode higher, it is possible to lower the resonance frequency of the detection mode by the electrostatic force during operation to match with the frequency of the driving mode, so that the detecting sensitivity may be extremely heightened.

In the embodiment, the angular rate sensor is composed by anodic bonding of single crystal silicon and glass, but the sensor may be also formed by bonding of silicon and silicon by using an insulating film properly.

A second embodiment of the invention is described below. It is an object of the second embodiment to present a small-sized vibratory angular rate sensor for driving and oscillating the vibrator by thermal stress.

FIG. 13 briefly describes the driving principle of the vibrator by thermal stress. FIG. 13(*a*), (*b*) shows a typical example of vibrator constituent elements using bridges of the embodiment, in which reference numeral 1001 denotes a mass made of n type (p type) semiconductor, 1002 is a beam similarly made of n type (p type) semiconductor, and 1003 is a diffused resistor layer of p type (n type) formed on both sides of the mass 1001 and beam 1002. This diffused resistor layer 1003 can be formed, for example, after forming the mass 1001 and beam 1002 by etching, by thermally diffusing p type boron in the case of n type semiconductor, or n type phosphorus in the case of p type semiconductor, while leaving the etching mask made of oxide film or the like. When driving and exciting, a voltage is applied to the diffused resistor layer 1003 by selecting the polarity so that pn junction formed by the diffused resistor layer 1003 and beam 1002 may be a reverse bias on the basis of the potential in the beam. Consequently, a current is injected to the diffused resistor layer 1003 of one side only periodically by matching with the resonance frequency of the vibrator. At this time, Joule heat is generated in the diffused resistor layer 1003, and the beam 1002 is deformed like a bimetal due to thermal stress. This deformation of the beam 1002 causes to drive the mass 1001 in direction B vertical to the bean side surface. At this time, one diffused resistor layer 1003 may be regarded as piezo resistance, and hence the driving amplitude can be monitored by measuring the resistance change by using, for example, a bridge. In this way, it is the basic principle of the embodiment to drive the mass 1001 by forming the diffused resistor layer 1003 at the side surface of the beam 1002 for supporting the mass 1001 supported at both ends, injecting a current periodically at the resonance frequency of the mass 1001, and inducing the deflection due to thermal expansion in the beam 1002. At the same time, by using the diffused resistor layer 1003 at the opposite side of the beam 1002 formed simultaneously as piezo resistance, the driving amplitude can be also monitored.

Next FIG. 13(*c*), (*d*) is an example of using cantilever beam, in which reference numeral 1004 is a mass made of n type (p type) semiconductor, 1005 is a beam similarly made of n type (p type) semiconductor, 1006 is a diffused resistor layer of p type (n type) formed on both sides of the mass 1004 and beam 1005, and 1007 is a through hole for contact of the p type (n type) diffused resistor layer 1006. As shown in the diagram, when using the cantilever beam 1005, a slight modification of constitution is needed. Otherwise, if the diffused resistor layer 1006 is fabricated after forming the mass 1004 and beam 1005 by etching, the both sides of the beam 1005 are connected at the resistance layer, the bimetal effect is canceled, and the beam 1005 cannot be driven by thermal stress. Accordingly, in the embodiment, before forming the mass 1004 and beam 1005 by etching, the through hole 1007 (for contact) is formed in the mass beforehand, and the diffusion layer is formed only above and below the beam side surfaces, and the both are connected by the through hole 1007. As a result, by injecting a current only in one side of the beam 1005, the mass can be driven by the bimetal effect.

Figure 14:
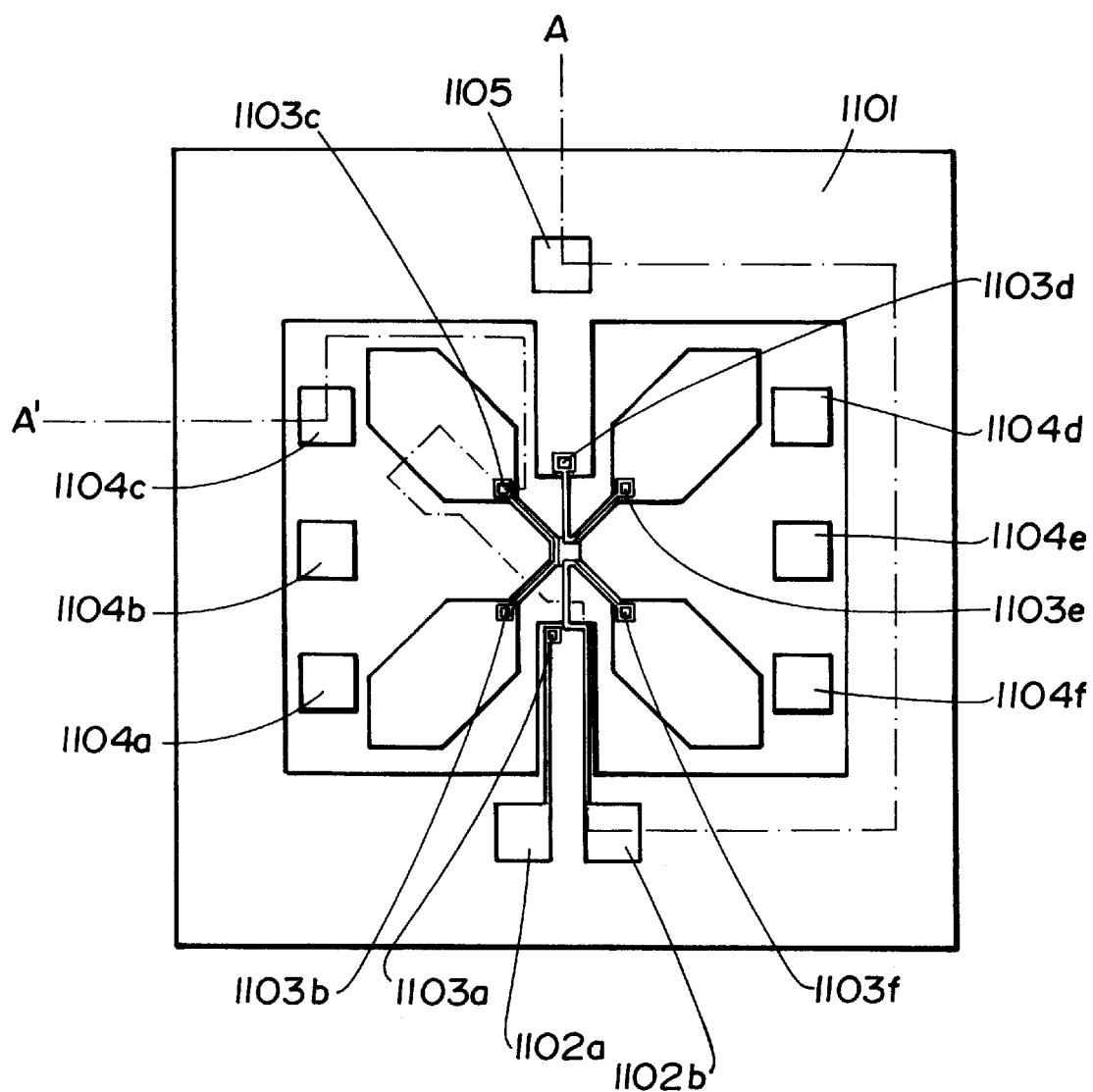
FIG. 14 is a plan view of a silicon substrate of the angular rate sensor in the second embodiment of the invention.
Figures 16A, 16B, 16C, 16D, 16E:
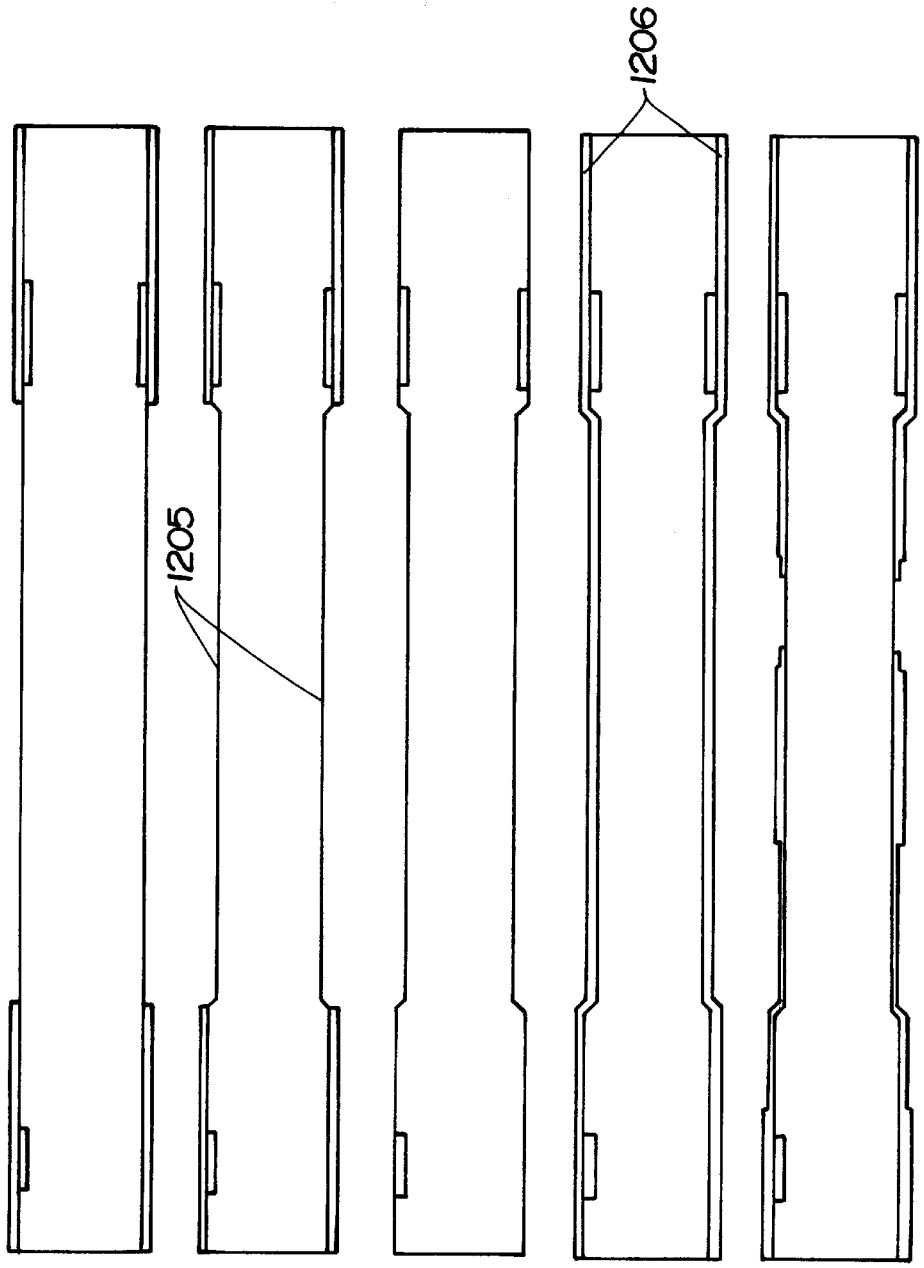
FIG. 16(f) to (j) is other part of process chart of silicon processing of the angular rate sensor in the second embodiment of the invention.
Figures 18A, 18B, 18C, 18D, 18E:
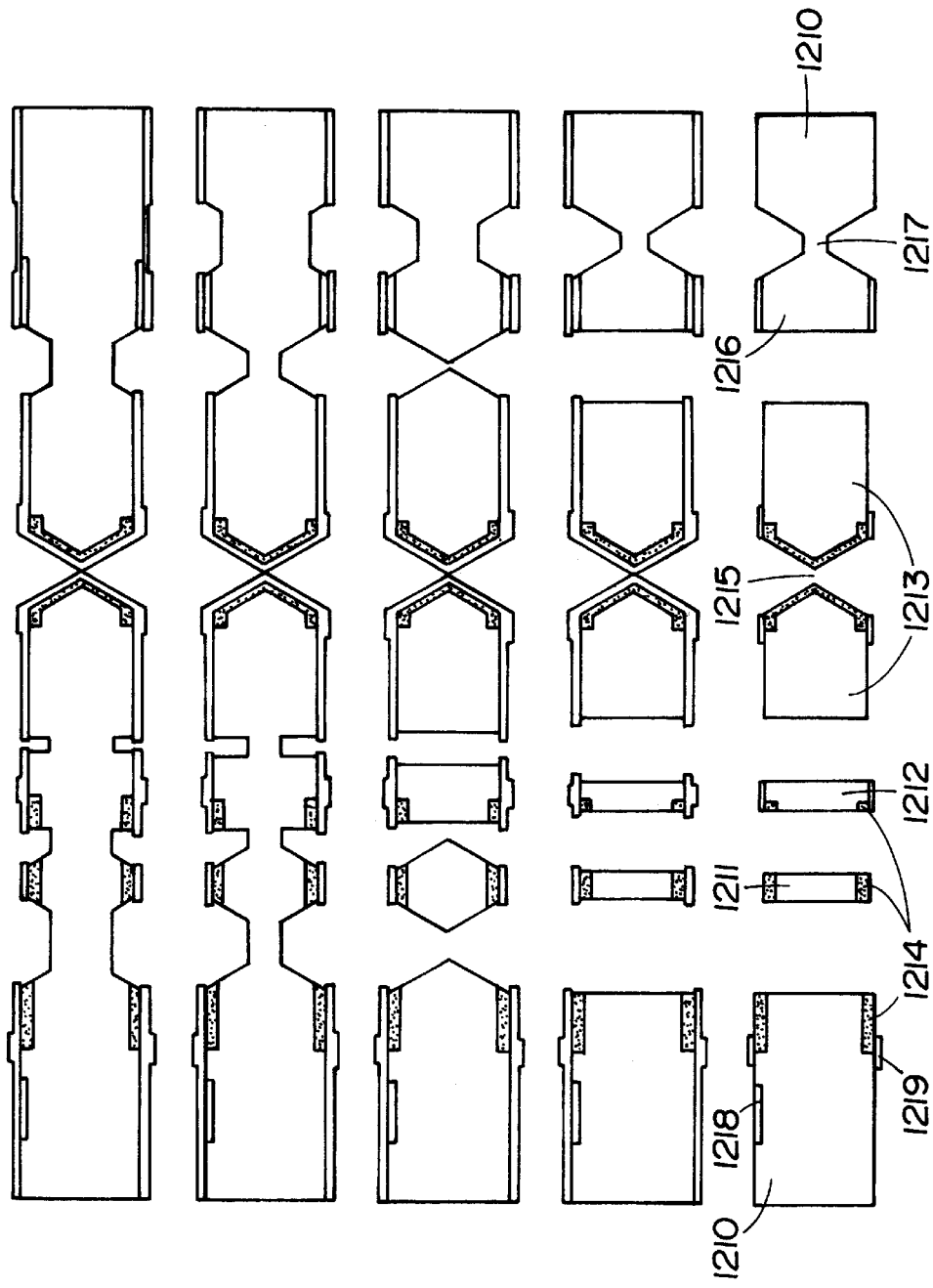
FIG. 18(p) to (t) is the remainder of process chart of silicon processing of the angular rate sensor in the second embodiment of the invention.

This is the basic principle of driving the vibrator by thermal stress, and the vibrator composed by combination of the above two kinds of basic masses can similarly excite vibration. Below, referring to an example of the vibrator shown in FIG. 14, a detail description is given according to the flowchart drawn while showing the section along A—A'. In this embodiment, both the cantilever beam and bilateral beam are formed as leaf spring vertical to the substrate surface, but the basic shape of the vibrator is not different from that of the first embodiment. In FIG. 14, reference numeral 1101 is a single crystal silicon substrate of (100) crystal plane, and it is an n type substrate in this embodiment. Reference numerals 1102*a, b* are p type diffused resistor layers formed by thermal diffusion, and 1103*a* to *f* are through holes for connecting diffusion resistance layer formed from both sides of the substrate. In the embodiment, the diffused resistor layers 1102*a, b* formed on both sides of the silicon substrate 1101 are connected through the through holes 1103*a* to *f*, and are formed only above and below the side surface vertical to the substrate closer to the bridge in the cantilever beam, and formed on upper and lower sides of the substrate in the bridge. Reference numerals 1104a to f are feedthrough islands for wiring, and an n type impurity such as phosphorus for improving the connection with the metal wiring is diffused on the substrate surface, and an $n^+$ diffused resistor layer is formed. Reference numeral 1105 is an $n^+$ diffused resistor layer formed for electrically grounding the vibrator.

FIG. 15 to FIG. 18 show detail of silicon process. In FIG. 15 to FIG. 18, the process is advanced sequentially from step (a) to step (t). A silicon substrate 1201 shown in step (a) an n type single crystal substrate of (100) crystal plane, and being of double-side polished type, the thickness is, for example, 200 μm. At step (b), by thermal oxidation, an oxide film 1202 is formed, and at next step (c), by patterning by photolithographic technique, the oxide film is partly removed by buffer hydrofluoric acid, and an n type impurity such as phosphorus is diffused to form an $n^+$ diffused resistor layer 1203. This $n^+$ layer is used for connection of electrode and wiring. At step (d), the oxide film is completely removed by using hydrofluoric acid solution, and at step (e), newly, thermal oxidation is performed to form an oxide film 1204. At step (f), the oxide film is removed by etching only from the portion for finally forming the vibrator, and at step (g) silicon is etched from both sides of the substrate to a specified depth (for example, 3 μm) (1205 in FIG. 15 to FIG. 18). In this embodiment, KOH or TMAH is used as etchant. When etching is over, the oxide film is removed completely again, and thermal oxidation is effected at step (i). This oxide film 1206 is used as mask for thermally diffusing boron as p type impurity. At step (j), the oxide film is etched by dividing into two steps. The oxide film is removed completely only in the portion for forming the through hole, and the other diffusion positions are only reduced in the thickness of oxide film. At step (k), a through hole 1207 (corresponding to 1103 in FIG. 14) is formed by two-side etching. When the hole 1207 is penetrated, at step (l), the oxide film is etched uniformly, and the oxide film at the diffusion position reduced in thickness of the oxide film at step (i) is removed. Further by diffusing boron (1208), the oxide film is removed completely at step (m). At next step (n), the oxide film 1209 is formed by final thermal oxidation process. This oxide film 1209 serves as the mask for forming the vibrator by etching the silicon substrate. At step (o), the oxide film is etched in three steps. The thickest portion is the protective film finally left over on the silicon substrate. The next thickest portion is the mask for penetration etching of silicon and forming of extra supporting beam. The thinnest portion is used as the mask for making a difference in the etching depth between the penetration portion and extra supporting beam portion. The portion being rid of the oxide film at this step is the portion for penetration etching. First at step (p), the silicon substrate is etched only in the penetration portion up to specified depth. When etching of specified depth is over, at step (q), the oxide film is etched uniformly, the oxide film in the extra supporting beam portion is removed, and silicon etching is resumed. Step (r) is a sectional view right after penetration of silicon substrate. At this stage, the side surface of the cantilever beam formed in <100> direction is composed of (100) crystal plane vertical to the substrate, but at the side surface of the bridge formed in <110> direction, (111) crystal plane at an angle of 54.74 degrees to the substrate surface appears. Finally, as shown in step (s), silicon etching is continued until the side surface of bridge is flattened vertically to the substrate surface by over-etching. Meanwhile, since etching is stopped at the stage of flattening of the side surface of bridge, the oxide film is etched at step (s) so that the final dimension of the vibrator may be a desired value while considering the etching rate of the side surface. The etching depth of silicon at step (p) is adjusted so that the thickness of the extra supporting beam may be a desired thickness at step (s). Finally, the oxide film is etched uniformly at step (t), and the oxide film is left over only in the desired position (1219). Finally, reference numeral 1210 corresponds to the frame, 1211 to the bridge, 1212 to the cantilever beam, 1213 to the mass, 1214 to the p type diffused resistor layer, 1215 to the contact through hole, 1216 to the feedthrough island, 1217 to the extra supporting beam, 1218 to the $n^+$ diffused resistor layer, and 1219 to the oxide film left over at the pn junction.

Figure 13A:
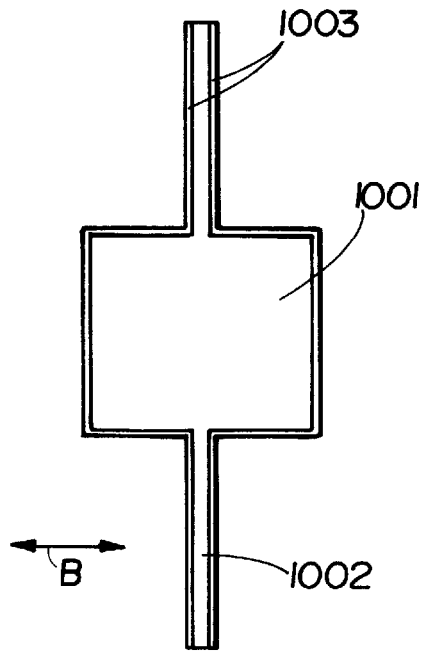
FIG. 13(a) to (d) is an explanatory diagram of driving principle of an angular rate sensor in a second embodiment of the invention.
Figure 13C:
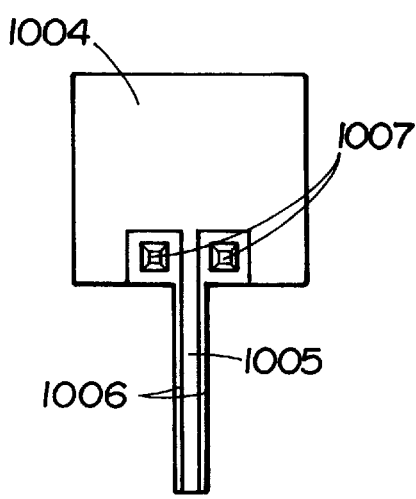
Figure 13B:
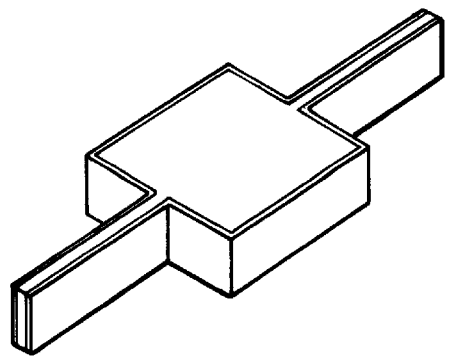
Figure 13D:
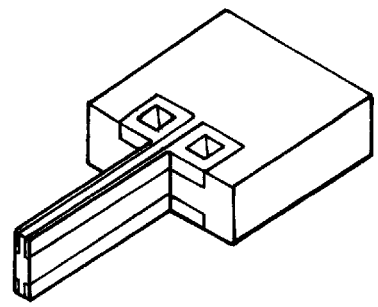

Finally, as shown in FIG. 13(c), (d), in the cantilever beam, the diffused resistor layer is formed only at one side surface closer to the bridge, whereas the diffused resistor layer is formed on the entire upper and lower surfaces parallel to the substrate in the bridge. This is the outline of the silicon process. In the embodiment, the vibrator is formed by employing the step etching technique of silicon oxide film ($SiO_2$), but it is also possible to form the vibrator by using both oxide film and nitride film ($Si_3N_4$) as the mask when etching Si.

The glass process is basically same as that in the first embodiment, and explanation in this embodiment is omitted. However, through holes formed on the upper glass are formed in a total of nine positions, including two positions in the p type diffused resistor layer 1102 and one position of n type diffusion layer 1105, as well as six positions of feedthrough islands 1104.

Figure 19:
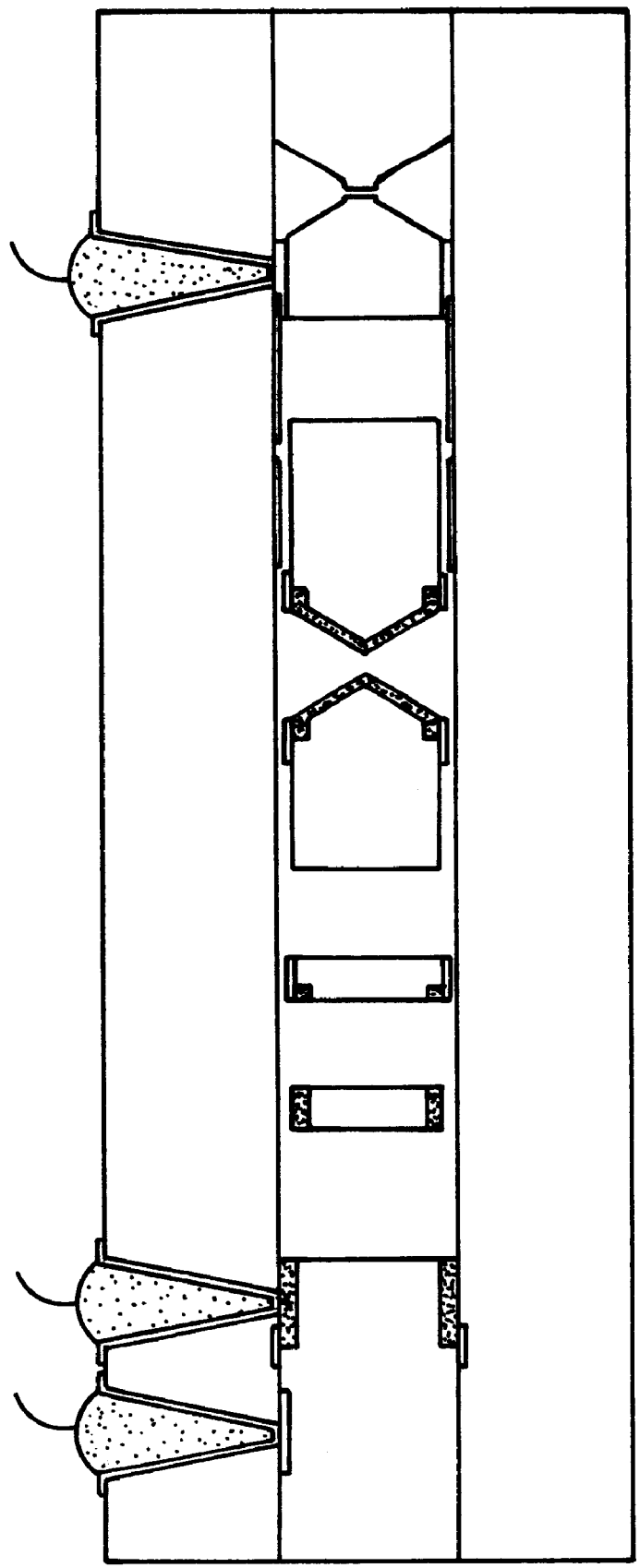
FIG. 19 is a sectional view after assembling of the angular rate sensor in the second embodiment of the invention.
Figure 20:
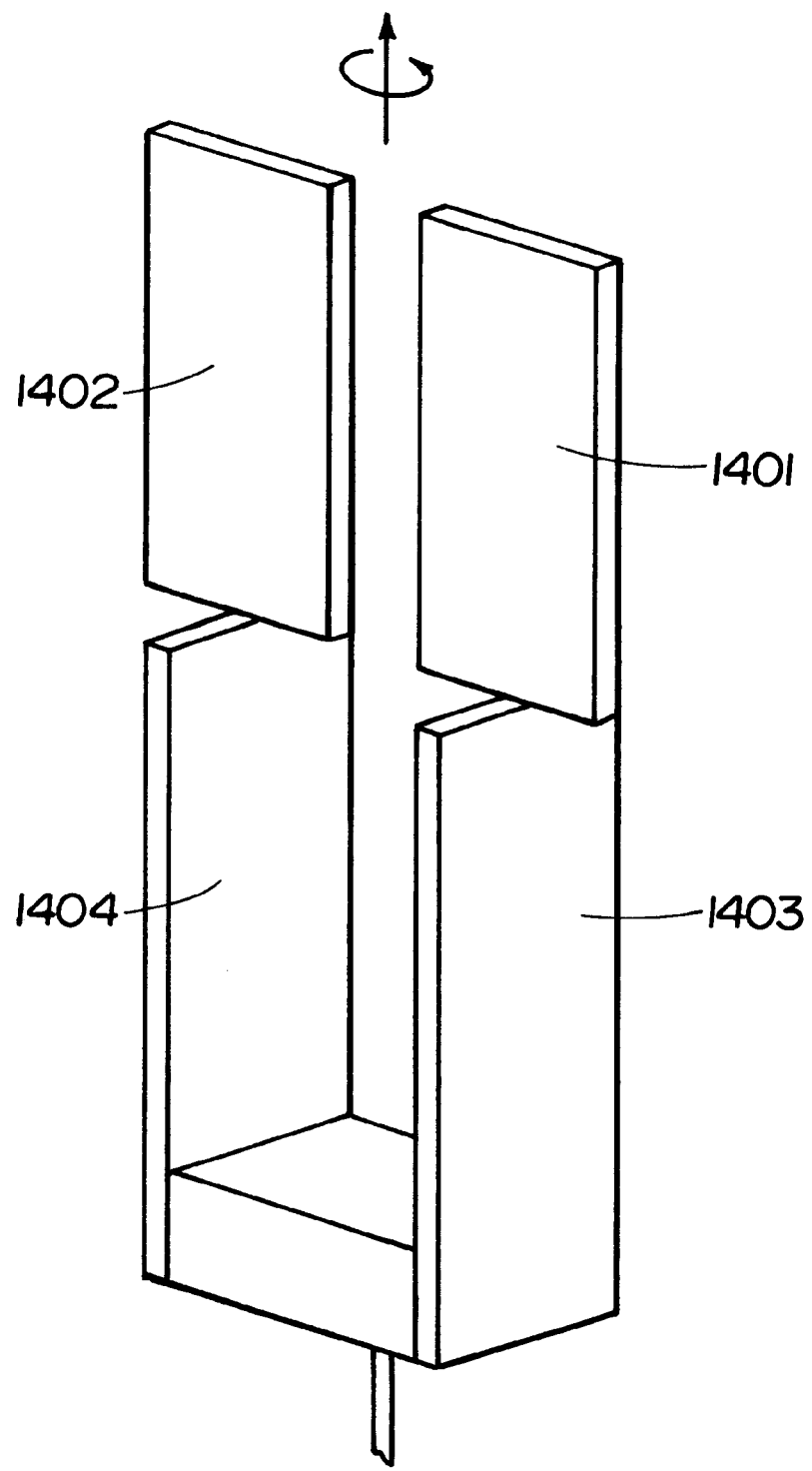
FIG. 20 is a schematic structural diagram of a vibrator of a tuning fork type vibratory gyro in prior art.

Finally they are bonded anodically, and the vibrator is completed. This is also same as in the first embodiment, and explanation is omitted. In the embodiment, however, only driving is done by thermal stress, and for monitoring of driving vibration and detection of angular velocity and control of resonance frequency, the capacitors composed of electrodes and vibrators are used same as in the first embodiment. Hence, the electrode may be conceptually regarded the constitution removing only those for driving in FIG. 1. Finally, the section is as shown in FIG. 19.

In the angular rate sensor of the embodiment thus constituted, the operating principle is briefly described below. However, since monitoring of driving amplitude and detection of angular rate are basically same as in the first embodiment, and only the driving excitation method is described below.

First, a direct current voltage is applied so that the pn junction formed of the p type diffused resistor layer 1214 (see FIG. 18) and n type frame 1210 may be reverse bias. Then a current is injected into the p type diffused resistor layer 1214 by matching with the driving resonance frequency. Herein, supposing the resistance of the diffused resistor layer 1214 to be R, the direct current component of the voltage Vd generated at both ends of the diffused resistor to be Vdc, and the alternating-current component thereof to be Vac, the power consumption P at the diffused resistor is expressed as $Vd^2/R$, and hence the relation of $P\ Vd^2$ is established. On the other hand, when the relation of Vdc>>Vac is established, it is possible from formula 2 to generate a heat consumption having a frequency equal to the driving frequency in the diffused resistor layer 1214. At this time, in the bridge 1211 (see FIG. 18), since equal Joule heat is generated on the upper and lower surfaces of the beam, vibration is not excited, but in the cantilever beam 1212, Joule heat is generated on the upper and lower surfaces of only the side vertical to the substrate close to the bridge 1211, a heat distribution occurs on the section of the beam. The temperature distribution is a function of heat flow flux, thermal conductivity, thermal diffusion rate, etc., and approximately it decreases exponentially from the diffused resistor forming side to the opposite side. The thermal stress due to this temperature distribution causes to excite vibration. Incidentally, considering from the level of thermal conductivity of silicon, the temperature difference that can be generated is not so large, and the static dislocation of mass is relatively small. Dynamically, however, as the Q factor capable of obtaining the dislocation amount multiplied by Q factor, a larger value exceeding, for example, 10,000 is also possible, and hence a large driving amplitude can be obtained.

In this embodiment, too, since there are four cantilever beams, the flexural linear vibration mode is considered in four types, but since the forming position of the diffused resistor layer is limited, each cantilever beam is driven in the opposite direction (outside) of. the bridge, and the driving vibration limited to one. The driving force depends on the calorific amount that can be generated by the diffused resistor, but the sheet resistance of the diffused resistor relating directly to the Joule heat can be arbitrarily selected by the diffusion condition.

In this way, in the second embodiment, by anisotropic etching of the single crystal silicon substrate of (100) crystal plane, the mass supported by the cantilever beam in <100> direction mainly composed of (100) crystal plane vertical to the substrate surface is formed, and the vibrator composed of four masses is supported by the bridge in <110> direction vertical to the substrate surface at the coupling portion positioned at the center of gravity, so that the vibrator excellent in symmetricity to the axis of rotation is formed. Accordingly, in the vibration mode of either driving or detection, the center of gravity is not changed, and energy loss is decreased. Moreover, for driving of the vibrator, the thermal stress generated in the diffused resistor layer formed at the side surface of the beam is used, and the angular rate is detected by capacitance change of the capacitor, and therefore it is not necessary to form a thin film on the vibrator or adhere a thin plate, and hence unwanted stress is not generated on the vibrator. Therefore, also because the vibrator is made of single crystal material intrinsically small in internal loss, a high Q value can be obtained. Further, as compared with the case of forming the vibrator with a thin film such as polysilicon, the vibrator of a lager mass can be formed in the same area, and the Coriolis force acting on the vibrator may be relatively large, so that the angular velocity detection sensitivity can be enhanced in a small-sized sensor. In addition, since the beam is formed of leaf spring and its side surface is matched with the crystal surface of the single crystal silicon, the vibrator can be formed easily at excellent symmetricity and reproducibility, and hence the ease of fabrication and high Q value (that is, high sensitivity) are realized at the same time.

In the second embodiment, the vibrator is composed of four masses (and beams), but it may be also composed of two pieces as far as the symmetricity is maintained. The bridges may be also one piece, instead of two pieces, and the vibrator coupling portion may be supported from one side only. Furthermore, the vibrator may be formed of bridges as shown in FIG. 13(a), (b), instead of cantilever beams. In such a case, two bridges are connected at both ends, and two connection points are fixed from both sides by two torsion bars respectively to support. This constitution is a modified structure of tuning fork supported at both ends. For example, still more, by using the outside diffused resistor layer for driving and the inside diffused resistor layer for detection as piezo resistance layer, it may be used as angular rate sensor of thermal stress driving system.

In the second embodiment, single crystal silicon substrate of (100) crystal plane is used, but single crystal silicon substrate of (110) crystal plane may be also used. In this case, the vibrator is composed as shown in FIG. 1, and the diffused resistor is formed on the beam and mass as shown in FIG. 14.

Incidentally, when the resonance frequency of the vibrator is matched in driving and detection mode and the vibrator is driven at this frequency, a maximum sensitivity can be obtained, but it is more difficult to match the two completely as the Q value becomes higher. But, by setting the resonance frequency of detection mode slightly higher, and lowering the resonance mode in the detection mode by electrostatic force during operation, it is possible to match with the resonance frequency in driving mode, so that the detection sensitivity can be notably enhanced same as in the first embodiment.

Further, in this embodiment, the vibrator is driven by diffused resistor heating,. but it is important only in producing temperature distribution in the section of the beam for driving, and it is possible to excite by raising the temperature only at one side of the beam by, for example, by expanding the laser light to a desired size by a lens system and emitting to the side surface of the cantilever beam.

A third embodiment of the invention is described below. It is an object of the third embodiment to present a small-sized acceleration sensor capable of detecting acceleration of two or more axes simultaneously at high sensitivity. In the acceleration sensor of semiconductor type, generally, the dislocation of the mass due to acceleration is detected from the piezo resistance, capacitance change or the like, and converted into acceleration. In this embodiment, the vibrator as shown in FIG. 2, FIG. 9 or FIG. 10 in the first embodiment is used as the mass, and the dislocation of the mass is detected by the capacitance change. Only the electrode composition for capacitance detection is different from the first embodiment, and the electrode for detection and control in FIG. 1 is not provided, and a total of 16 electrodes consisting of four upper and lower ones for driving and monitor for each mass supported by the cantilever beams are separately and independently provided.

When the sensor substrate surface is installed parallel to the ground, in the case the acceleration is applied, for example, in the torsion bar direction, and in the case the acceleration is-applied in a direction vertical thereto within the same horizontal plane, the dislocation direction of four masses is different. Accordingly, by adding and subtracting the capacitance change determined in each electrode so as to be suited to the axis of detection, the dislocation amount of mass in a desired axial direction within the horizontal plane can be determined, and finally from the equilibrium of inertial force and spring force (F=ma=kx), the component of a desired axial direction of acceleration can be determined (a=kx/m). Incidentally, as the technique for detecting the capacitance, various methods are possible, including conversion into voltage, conversion into pulse width and conversion into frequency, and, for example, a diode bridge circuit may be employed. This technique is specifically reported by Harrison et al. (A diode-quad bridge for use with capacitive transducers, Rev., Sci. Instrum., 44, 1973, pp. 1468–1472). The acceleration of two axes within the horizontal plane can be determined in the above method.

The acceleration in the plane horizontal to the ground is detected by deflection of the cantilever beam supporting the mass, but the acceleration in a direction vertical to the ground is detected by deflection of the bridge. For example, when the acceleration is applied upward, all masses are dislocated downward, and all capacities formed of the lower glass side electrodes are increased. Hence, same as when determining the horizontal component, the vertical direction components of the acceleration can be calculated, and acceleration components of all three axes can be determined.

Thus, according to the third embodiment, each mass is supported by employing the plane determined by the crystal direction on the side surface of the cantilever beam vertical to the Si substrate (that is, (111) crystal plane in (110) crystal plane substrate, or (100) crystal plane in (100) crystal plane substrate), the acceleration within the horizontal plane is detected by deflection of this cantilever beam. Therefore, a thin and flexible mass having a section of large aspect ratio can be easily fabricated by wet etching or similar technique, and the amplitude of vibration for motion within the horizontal plane may be set larger. Hence, the detection sensitivity can be enhanced. Besides, as the azimuth of the cantilever beam, two kinds can be selected, and the acceleration of multiple axes can be separately detected from the behavior of the mass supported by the beam in different azimuth. As a result, a small-sized acceleration sensor can be composed.

In the embodiment, the same structure as the vibrator of the angular rate sensor in the first embodiment is used as the mass, but since resonance is not utilized intentionally in acceleration sensor, different from the first embodiment, it is necessary to adjust the size of the parts and add proper damping by adjustment of degree of vacuum so that the resonance may not pose problem in a desired band. Besides, each mass is supported by one linear cantilever beam, but it may be also supported by a plurality of beams, or the mass may be supported by a deflected beam by combining cantilever beams differing in azimuth.

As described herein, according to the invention, by using a single crystal material small in internal loss by nature, the vibrator of small energy loss can be formed without adding causes of undesired stress such as thin film. Hence, a high Q value can be obtained. Also using bulk silicon material, the vibrator of a relatively large mass can be formed. Hence, the Coriolis force acting on the vibrator may be large, so that the detection sensitivity of angular rate may be enhanced in a small-sized sensor. Moreover, supporting the mass by the beam having a side surface vertical to the substrate and a sectional shape of a large aspect ratio, the amplitude of vibration of the mass is extended, and the acceleration sensitivity is improved. It is also possible to detect the acceleration sensitivity of multiple axes from the behavior of each axis supported by the beams differing in the azimuth, so that an acceleration sensor of small size can be composed. Hence, its practical effects are tremendous.

What is claimed is:

1. A sensor for detecting angular rate or acceleration comprising:
   a vibrator having
      at least two masses, formed from a single crystal silicon substrate having a principal surface thereof formed in a (110) crystal plane, and
      at least two beams for supporting the masses, each of the at least two beams having a principal surface thereof formed in a (111) crystal plane which is vertical relative to the principal surface of the silicon substrate, such that the beams have flexibility in a plane that is parallel to the principal surface of the silicon substrate; and
   electrodes for driving the vibrator.

2. A sensor for detecting angular rate or acceleration as recited in claim 1, wherein said vibrator further includes a beam having a principal surface thereof formed in a (110) crystal plane parallel to the principal surface of the silicon substrate.

3. A sensor for detecting angular rate or acceleration comprising:
   a vibrator having
      at least two masses formed from a single crystal silicon substrate having a principal surface thereof formed in a (100) crystal plane, and
      at least two beams for supporting the masses, each of the at least two beams having a principal surface thereof formed in a (100) crystal plane which is vertical relative to the principal surface of the silicon substrate, such that the at least two beams have flexibility in a plane that is parallel to the principal surface of the silicon substrate; and
   electrodes for driving the vibrator.

4. A sensor for detecting angular rate or acceleration as recited in claim 3, wherein said vibrator further includes a beam having a principal surface thereof formed in a (100) crystal plane parallel to the principal surface of the silicon substrate.

5. A sensor for detecting angular rate or acceleration as recited in claim 1, wherein said vibrator is formed by crystallographic anisotropic etching or reactive ion etching.

6. A sensor for detecting angular rate or acceleration as recited in claim 3, wherein said vibrator is formed by crystallographic anisotropic etching or reactive ion etching.

* * * * *